(12) United States Patent
Maeda

(10) Patent No.: US 8,325,932 B2
(45) Date of Patent: Dec. 4, 2012

(54) ENGINE SOUND SYNTHESIZER, MOTOR VEHICLE AND GAME MACHINE EMPLOYING THE ENGINE SOUND SYNTHESIZER, ENGINE SOUND SYNTHESIZING METHOD, AND RECORDING MEDIUM CONTAINING COMPUTER PROGRAM FOR ENGINE SOUND SYNTHESIS

(75) Inventor: Osamu Maeda, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 645 days.

(21) Appl. No.: 12/549,543

(22) Filed: Aug. 28, 2009

(65) Prior Publication Data

US 2009/0325700 A1    Dec. 31, 2009

Related U.S. Application Data

(63) Continuation of application No. 10/953,370, filed on Sep. 30, 2004, now Pat. No. 7,606,374.

(30) Foreign Application Priority Data

Oct. 9, 2003    (JP) ................................. 2003-351198

(51) Int. Cl.
*H03G 3/00* (2006.01)
*H04B 1/00* (2006.01)
(52) U.S. Cl. .......................................... 381/61; 381/86
(58) Field of Classification Search .................. 381/86, 381/61, 97; 340/441, 384.3; 446/410
See application file for complete search history.

(56) References Cited

U.S. PATENT DOCUMENTS 4,701,956 A * 10/1987 Katoh .............................. 381/61
6,859,539 B1    2/2005 Maeda

FOREIGN PATENT DOCUMENTS

| JP | 10-277263 A | 10/1998 |
| JP | 11-249672 A | 9/1999 |
| JP | 2000-010576 A | 1/2000 |
| JP | 2002-233001 A | 8/2002 |

OTHER PUBLICATIONS

Maeda; "Engine Sound Synthesizer, Motor Vehicle and Game Machine Employing the Engine Sound Synthesizer, Engine Sound Synthesizing Method, and Recording Medium Containing Computer Program for Engine Sound Synthesis"; U.S. Appl. No. 10/953,370, filed Sep. 30, 2004.
Maeda; "Vehicle Sound Synthesizer"; U.S. Appl. No. 10/791,105, filed Mar. 2, 2004.
Official Communication issued in corresponding Japanese Patent Application No. 2008-264212, mailed on Mar. 11, 2010.

* cited by examiner

*Primary Examiner* — Ping Lee
(74) *Attorney, Agent, or Firm* — Keating & Bennett, LLP

(57) ABSTRACT

An engine sound synthesizer includes an engine sound storing section, and a synthetic engine sound data generating section which generates synthetic engine sound data on the basis of engine sound data stored in the engine sound storing section. The engine sound storing section stores therein plural groups of plural entities of engine sound data recorded in different driving states, the plural groups of plural engine sound data entities being stored therein in correspondence with predetermined plural driving state ranges. The synthetic engine sound data generating section generates the synthetic engine sound data by selectively reading out of the engine sound storing section plural engine sound data entities in a group corresponding to one of the driving state ranges specified by externally input driving state specification information and selectively combining the read engine sound data entities. The driving states are each defined, for example, by a throttle opening degree and an engine rotation speed.

11 Claims, 15 Drawing Sheets

ENGINE SOUND SYNTHESIZER, MOTOR VEHICLE AND GAME MACHINE EMPLOYING THE ENGINE SOUND SYNTHESIZER, ENGINE SOUND SYNTHESIZING METHOD, AND RECORDING MEDIUM CONTAINING COMPUTER PROGRAM FOR ENGINE SOUND SYNTHESIS

BACKGROUND OF THE INVENTION

1. Field of the Invention

The present invention relates to an engine sound synthesizer and an engine sound synthesizing method for synthesizing an engine sound that sounds much closer to an actual engine sound on the basis of the actual engine sound. The present invention further relates to a game machine and a motor vehicle each incorporating the engine sound synthesizer. The present invention still further relates to a computer program for engine sound synthesis, a game program incorporating the computer program, and a recording medium containing the computer program.

2. Description of Related Art

A prior-art engine sound synthesizer is disclosed in Japanese Unexamined Patent Publication No. 2000-010576. In the prior-art engine sound synthesizer disclosed in this patent publication, an engine driving state is divided into a plurality of driving state ranges on the basis of an accelerator opening degree and an engine rotation speed which are used as parameters. An engine sound is preliminarily recorded in a driving state at around a median of each of the driving state ranges. A digital data entity of an engine sound segment in a time frame during which a crank shaft is rotated in one combustion cycle is extracted from the recorded engine sound. The engine sound data entities thus extracted for the respective driving state ranges are preliminarily stored in a storage section. In the engine sound synthesizer, an engine sound data entity for a driving state range specified by inputs of the accelerator opening degree and the engine rotation speed is readout of the storage section and repeatedly reproduced for generation of a synthetic engine sound. For realization of the unique indefiniteness of the actual engine sound, at least one of the loudness, frequency and tone of the synthetic engine sound to be generated is changed every time the engine sound data entity is reproduced.

However, the prior-art engine sound synthesizer stores only one engine sound data entity for each of the driving state ranges provided by dividing the engine driving state on the basis of the accelerator opening degree and the engine rotation speed which are used as the parameters. Therefore, it is impossible to generate a synthetic engine sound that is equivalent to the actual engine sound simply by modifying the single engine sound data entity in various ways.

SUMMARY OF THE INVENTION

In order to overcome the problems described above, preferred embodiments of the present invention provide an engine sound synthesizer and an engine sound synthesizing method for generating a synthetic engine sound that is much closer to an actual engine sound.

Other preferred embodiments of the present invention provide a motor vehicle and a game machine incorporating an engine sound synthesizer which is capable of generating a synthetic engine sound that is much closer to an actual engine sound.

Further preferred embodiments of the present invention provide a computer program for generating a synthetic engine sound that is much closer to an actual engine sound, a game program incorporating the computer program, and a recording medium containing the computer program.

A first engine sound synthesizer according to a preferred embodiment of the present invention includes a storage unit which stores therein plural groups of plural entities of engine sound data recorded in different driving states, the plural groups of plural engine sound data entities being stored therein in correspondence with predetermined plural driving state ranges, and a synthetic engine sound data generating unit which generates synthetic engine sound data by selectively reading out of the storage unit plural engine sound data entities in a group corresponding to one of the driving state ranges specified by externally input driving state specification information and selectively combining the read engine sound data entities.

With this arrangement, the plural groups of plural engine sound data entities are stored in correspondence with the respective driving state ranges in the storage unit. When the driving state specification information is applied from the outside, the engine sound data entities in the group corresponding to the driving state range specified by the driving state specification information are selectively read out of the storage unit, and the read engine sound data entities are selectively combined for the generation of the synthetic engine sound data. Therefore, a synthetic engine sound synthesized on the basis of the synthetic engine sound data thus generated is much closer in indefiniteness to the actual engine sound than a synthetic engine sound synthesized on the basis of a single engine sound data entity.

The engine sound data entities are preferably prepared by recording an engine sound while actually driving an engine, and extracting data from any segments of the recorded engine sound. More specifically, an engine sound is recorded while the driving state of the engine is changed continuously or stepwise, and the engine sound data entities are extracted from the recorded engine sound for each driving state range.

The process for combining the plural engine sound data entities may be achieved by superposing the plural engine sound data entities (hereinafter referred to as a superposing process). Alternatively, the combining process may be achieved by sequentially concatenating the plural engine sound data entities along a time axis (time-axis based concatenation process). The combining process may be achieved by using the superposing process and the time-axis based concatenation process in combination.

More specifically, the synthetic engine sound data generating unit may include a superposing unit which superposes at least two of the plural engine sound data entities in the group corresponding to the driving state range specified by the driving state specification information. Thus, the synthetic engine sound data is imparted with sufficient indefiniteness, thereby providing a synthetic sound that is very close to the actual engine sound.

According to one preferred embodiment of the present invention, the engine sound synthesizer further includes a weighting unit which weights the at least two engine sound data entities to be superposed by the superposing unit. Thus, the synthetic engine sound data is imparted with a higher degree of indefiniteness, thereby providing a synthetic sound that is much closer to the actual engine sound.

The synthetic engine sound data generating unit may successively select plural sets of predetermined numbers of engine sound data entities from the plural engine sound data entities in the group corresponding to the driving state range specified by the driving state specification information and concatenate the plural sets of engine sound data entities. With this arrangement, different sets of engine sound data entities are used to constitute the synthetic engine sound data, and concatenated along the time axis. Thus, the synthetic engine sound data is imparted with sufficient indefiniteness. Where the plural sets of plural engine sound data entities are successively selected and concatenated along the time axis for the generation of the synthetic engine sound data, the superposing process and the time-axis based concatenation process can be used in combination, thereby providing a synthetic engine sound having a higher degree of indefiniteness.

The synthetic engine sound data generating unit may include a plurality of weighting unit which respectively weight the plural engine sound data entities in the group corresponding to the driving state range specified by the driving state specification information, a reading controlling unit which reads out of the storage unit the plural engine sound data entities in the group corresponding to the driving state range specified by the driving state specification information and applies the read engine sound data entities to the respective weighting unit, a weight setting unit which determines weights to be assigned to the engine sound data entities for the respective weighting unit, and a superposing unit which superposes the engine sound data entities weighted by the respective weighting unit.

With this arrangement, the plural engine sound data entities are respectively weighted, and the superposing process is performed to superpose the weighted engine sound data entities. If a zero weight is assigned to an engine sound data entity, the engine sound data entity does not contribute to the generation of the synthetic sound. Therefore, it is possible to select or unselect the engine sound data entities by assigning a zero weight or a non-zero weight to the engine sound data entities. Where the non-zero weight is assigned to a predetermined number of engine sound data entities and the zero weight is assigned to the other engine sound data entities, for example, the predetermined number of engine sound data entities are selected to be combined together to generate the synthetic engine sound data. Further, where different sets of predetermined numbers of engine sound data entities are successively selected by assigning the non-zero weight thereto, the above-mentioned time-axis based concatenation process can be performed.

The synthetic engine sound data generating unit may include a synthesizing unit which generates synthetic sound data by selectively reading out of the storage unit the plural engine sound data entities in the group corresponding to the driving state range specified by the driving state specification information and selectively combining the read engine sound data entities, a fluctuating unit which imparts a sound pressure fluctuation to the synthetic sound data generated by the synthesizing unit, and a fluctuation width controlling unit which controls the width of the sound pressure fluctuation to be imparted to the synthetic sound data by the fluctuating unit on the basis of the driving state specification information.

With this arrangement, the sound pressure fluctuation having a width variable according to the driving state is imparted to the synthetic sound data. Thus, a synthetic sound having a proper fluctuation according to the driving state can be generated and, hence, is closer to the actual engine sound.

The fluctuating unit may include a sound pressure amplifying section that processes the synthetic sound data to amplify the sound pressure thereof. The sound pressure amplifying section may variably set its gain for every predetermined unit of the synthetic sound data so as to impart relative sound pressure variation (fluctuation) between a pair of synthetic sound data units that are adjacent to each other along a time axis. The predetermined unit of the synthetic sound data may correspond to one explosion of one cylinder of an engine, or may correspond to one combustion cycle. In general, where each one of the engine sound data entities stored in the storage unit correspond to a predetermined unit (one explosion of one cylinder, one combustion cycle, or the like), it is preferable that the gain of the sound pressure amplifying section is varied for every such predetermined unit of the synthetic sound data.

The sound pressure amplifying section may set its gain that is variable for every predetermined time period so as to impart relative sound pressure variation (fluctuation) between a pair of synthetic sound data segments of the predetermined time period that are adjacent to each other along a time axis.

The driving states are preferably each defined by parameters including a throttle opening degree and an engine rotation speed. Accordingly, the plural driving state ranges are preferably each defined on the basis of a throttle opening degree range and an engine rotation speed range, and the driving state specification information preferably includes information related to the throttle opening degree and the engine rotation speed. The information related to the throttle opening degree and the engine rotation speed may be information, such as an accelerator opening degree and a shift position of a transmission, from which the throttle opening degree and the engine rotation speed can be estimated through a predetermined computation.

The engine throttle opening degree and the engine rotation speed are parameters which directly influence the engine sound. Therefore, the driving state ranges are each defined by using the engine throttle opening degree and the engine rotation speed as parameters, whereby a synthetic sound that is very close to the actual engine sound can be generated.

That is, the driving states each defined by the throttle opening degree (corresponding to a driving operation amount) and the engine rotation speed are divided into the plural driving state ranges, and the plural groups of plural engine sound data entities for the respective driving state ranges are prepared from the engine sound data recorded in the driving states. By using the plural engine sound data entities in each of the groups, the indefiniteness of the actual engine sound in each of the driving state ranges can be reproduced with fidelity.

The engine sound synthesizer may be adapted to synthesize an engine sound of an engine having a plurality of cylinders. In this case, the synthetic engine sound data generating unit preferably includes a synthesizing unit which generates synthetic sound data by selectively reading out of the storage unit the plural engine sound data entities in the group corresponding to the driving state range specified by the driving state specification information and selectively combining the read engine sound data entities, an inter-cylinder time lag calculating unit which calculates an inter-cylinder engine sound time lag on the basis of the engine rotation speed information, a delaying unit which delays the synthetic sound data generated by the synthesizing unit by the time lag calculated by the inter-cylinder time lag calculating unit, and an inter-cylinder mixing unit which superposes the synthetic sound data generated by the synthesizing unit and the synthetic sound data delayed by the delaying unit for mixing.

With this arrangement, for example, where engine sound data of a single-cylinder engine is stored in the storage unit, the engine sound of the multi-cylinder engine can be synthesized in consideration of the inter-cylinder time lag. Thus, the storage capacity requirement of the storage unit can be reduced, and a task for the recording of the engine sound can be eliminated. In addition, plural kinds of engine sounds can be synthesized by using data of a single sound source, so that the number of the engine sound data entities for each of the driving state ranges can be increased. Thus, a synthetic sound having a higher degree of indefiniteness can be generated.

The storage unit preferably stores therein a first number of engine sound data entities for a first driving state range, and a second number of engine sound data entities greater than the first number for a second driving state range defined by a smaller throttle opening degree than the first driving state range. Further, the storage unit preferably stores therein a third number of engine sound data entities for a third driving state range, and a fourth number of engine sound data entities greater than the third number for a fourth driving state range defined by a lower engine rotation speed than the third driving state range.

That is, a smaller number (sample number) of engine sound data entities are stored in the storage unit for a driving state range defined by a smaller throttle opening degree and/or a lower engine rotation speed. Further, a greater number (sample number) of engine sound data entities are stored in the storage unit for a driving state range defined by a greater throttle opening degree and/or a higher engine rotation speed. Thus, a synthetic sound that is very close to the actual engine sound can be generated. This is because, as the throttle opening degree or the engine rotation speed decreases, the stability of the operation of the actual engine is reduced and the indefiniteness of the engine sound is correspondingly increased.

A second engine sound synthesizer according to another preferred embodiment the present invention includes a storage unit which stores therein engine sound data entities as source data, a synthesizing unit which generates synthetic sound data by selectively reading the engine sound data entities out of the storage unit and selectively combining the read engine sound data entities, a fluctuating unit which imparts a sound pressure fluctuation to the synthetic sound data generated by the synthesizing unit to generate fluctuated synthetic engine sound data, and a fluctuation width controlling unit which controls the width of the sound pressure fluctuation to be imparted to the synthetic sound data by the fluctuating unit on the basis of externally input driving state specification information specifying a driving state of a virtual engine.

With this arrangement, the sound pressure fluctuation to be imparted to the synthetic sound data has a fluctuation width variable according to the engine driving state. Thus, a synthetic sound having a proper fluctuation according to the driving state can be generated and, hence, is very close to the actual engine sound.

The driving state of the virtual engine is preferably defined by parameters including a throttle opening degree and an engine rotation speed. Accordingly, the driving state specification information preferably includes information related to the throttle opening degree and the engine rotation speed.

In this case, the fluctuation width controlling unit preferably determines the width of the sound pressure fluctuation so that the width of the sound pressure fluctuation is increased as the engine rotation speed decreases. Thus, a synthetic sound having a greater sound pressure fluctuation width can be generated where the stability of the engine state is reduced when the engine is rotated at a lower speed. Hence, the synthetic sound is much closer to the actual engine sound.

The engine sound synthesizer may be adapted to synthesize an engine sound of an engine having a plurality of cylinders. In this case, the synthetic engine sound data generating unit preferably includes an inter-cylinder time lag calculating unit which calculates an inter-cylinder engine sound time lag on the basis of the engine rotation speed information, a delaying unit which delays the synthetic sound data generated by the synthesizing unit by the time lag calculated by the inter-cylinder time lag calculating unit, and an inter-cylinder mixing unit which superposes the synthetic sound data generated by the synthesizing unit and the synthetic sound data delayed by the delaying unit for mixing.

This arrangement makes it possible, for example, to synthesize the engine sound of the multi-cylinder engine by using an engine sound recorded by driving a single-cylinder engine, and to impart the synthetic sound with the fluctuation.

In this case, the engine sound synthesizer preferably further includes, in addition to the fluctuating unit as a first fluctuating unit, a second fluctuating unit which imparts a sound pressure fluctuation to the synthetic sound data delayed by the delaying unit to generate fluctuated synthetic sound data. In this case, the inter-cylinder mixing unit is adapted to superpose the fluctuated synthetic engine sound data generated by the first fluctuating unit and the fluctuated synthetic engine sound data generated by the second fluctuating unit for mixing, and the fluctuation width controlling unit is adapted to control the widths of the sound pressure fluctuations to be imparted to the synthetic sound data by the first and second fluctuating units.

With this arrangement, the sound pressure fluctuation is imparted to the synthetic sound data subjected to the inter-cylinder delaying process, so that an engine sound having a higher degree of indefiniteness can be synthesized. Particularly, where the sound pressure fluctuations to be imparted to the synthetic sound data by the first and second fluctuating units have different patterns (intensity patterns), an engine sound having a higher degree of indefiniteness can be synthesized. The fluctuation width controlling unit may assign different sound pressure fluctuation widths to the first and second fluctuating units.

A motor vehicle according to another preferred embodiment of the present invention includes an input section for inputting driving state specification information, an engine sound synthesizer having either of the constructions according to the preferred embodiments described above, and an output section which outputs a synthetic engine sound on the basis of synthetic engine sound data generated by the engine sound synthesizer. For example, the motor vehicle may be a motor vehicle such as an electric motor vehicle having no engine (internal combustion engine). In this case, the motor vehicle can generate a synthetic engine sound that is very close to a sound generated by an engine-mounted motor vehicle. Thus, a driver and a passenger in the motor vehicle hear the synthetic engine sound thereby to feel satisfaction as if riding on the engine-mounted motor vehicle. Further, people around the motor vehicle (particularly pedestrians) hear the synthetic engine sound thereby to recognize the presence of the motor vehicle.

A game machine according to the present invention includes an operation section for inputting driving state specification information, an engine sound synthesizer having either of the constructions according to preferred embodiments described above, and an output section which outputs a synthetic engine sound on the basis of synthetic engine sound data generated by the engine sound synthesizer. With this arrangement, synthetic engine sound data having sufficient indefiniteness is generated according to the operation of the operation section by a player, and the synthetic engine sound is outputted from the output section on the basis of the synthetic engine sound data. Thus, the player can play a game while hearing a synthetic sound that is close to the actual engine sound. Therefore, verisimilitude provided by the game machine can be enhanced.

A first engine sound synthesizing method according to another preferred embodiment of the present invention includes the steps of preliminarily storing plural groups of plural entities of engine sound data recorded in different driving states in a storage unit, the plural groups of plural engine sound data entities being stored in correspondence with predetermined plural driving state ranges in the storage unit, receiving driving state specification information specifying a driving state of a virtual engine, and generating synthetic engine sound data by selectively reading out of the storage unit plural engine sound data entities in a group corresponding to one of the driving state ranges specified by the driving state specification information and selectively combining the read engine sound data entities.

In this method, the synthetic engine sound data is generated by selectively combining the plural engine sound data entities in the group corresponding to the driving state range specified by the driving state specification information. Since the synthetic engine sound data thus generated has a higher degree of indefiniteness, a synthetic sound that is very close to the actual engine sound can be generated with the use of the synthetic engine sound data.

The synthetic engine sound data generating step may include the step of superposing at least two of the plural engine sound data entities in the group corresponding to the driving state range specified by the driving state specification information. Further, the synthetic engine sound data generating step may include the step of successively selecting plural sets of predetermined numbers of engine sound data entities from the plural engine sound data entities in the group corresponding to the driving state range specified by the driving state specification information and concatenating the plural sets of engine sound data entities.

The synthetic engine sound data generating step preferably includes the steps of selectively reading out of the storage unit the plural engine sound data entities in the group corresponding to the driving state range specified by the driving state specification information, generating synthetic sound data by selectively combining the read engine sound data entities, imparting a sound pressure fluctuation to the generated synthetic sound data, and controlling the width of the sound pressure fluctuation to be imparted to the synthetic sound data on the basis of the driving state specification information. Thus, the synthetic engine sound data imparted with the sound pressure fluctuation has sufficient indefiniteness, thereby making it possible to generate a synthetic sound that is much closer to the actual engine sound.

A second engine sound synthesizing method according to another preferred embodiment of the present invention includes the steps of receiving driving state specification information specifying a driving state of a virtual engine, generating synthetic sound data by selectively reading engine sound data entities as source data out of a storage unit and selectively combining the read engine sound data entities, imparting a sound pressure fluctuation to the generated synthetic sound data, and controlling the width of the sound pressure fluctuation to be imparted to the synthetic sound data on the basis of the driving state specification information.

In this method, the sound pressure fluctuation to be imparted to the synthetic sound data has a fluctuation width variable according to the engine driving state. Thus, a synthetic sound having a proper fluctuation according to the driving state can be generated and, hence, is very close to the actual engine sound.

A first computer program according to another preferred embodiment of the present invention is a computer program which causes a computer to operate as an engine sound synthesizer for synthesizing an engine sound. The computer includes a storage unit which stores therein plural groups of plural entities of engine sound data recorded in different driving states, the plural groups of plural engine sound data entities being stored therein in correspondence with predetermined plural driving state ranges. The computer program causes the computer to function as a driving state specification information receiving unit which receives driving state specification information specifying a driving state of a virtual engine, and a synthetic engine sound data generating unit which generates synthetic engine sound data by selectively reading out of the storage unit plural engine sound data entities in a group corresponding to the driving state range specified by the driving state specification information received by the driving state specification information receiving unit and selectively combining the read engine sound data entities.

The computer program is run on the computer, whereby the computer functions as the above-described first engine sound synthesizer. The function of the engine sound synthesizer constituted by the computer can easily be enhanced by upgrading the version of the computer program.

The synthetic engine sound data generating unit may include a superposing unit which superposes at least two of the plural engine sound data entities in the group corresponding to the driving state range specified by the driving state specification information. Further, the synthetic engine sound data generating unit may successively select plural sets of predetermined numbers of engine sound data entities from the plural engine sound data entities in the group corresponding to the driving state range specified by the driving state specification information and concatenate the plural sets of engine sound data entities.

The synthetic engine sound data generating unit preferably includes a synthesizing unit which generates synthetic sound data by selectively reading out of the storage unit the plural engine sound data entities in the group corresponding to the driving state range specified by the driving state specification information and selectively combining the read engine sound data entities, a fluctuating unit which imparts a sound pressure fluctuation to the synthetic sound data generated by the synthesizing unit, and a fluctuation width controlling unit which controls the width of the sound pressure fluctuation to be imparted to the synthetic sound data by the fluctuating unit on the basis of the driving state specification information.

The driving states may each be defined by parameters including a throttle opening degree and an engine rotation speed, for example. In this case, the plural driving state ranges are preferably each defined on the basis of a throttle opening degree range and an engine rotation speed range, and the driving state specification information preferably includes information related to the throttle opening degree and the engine rotation speed.

A second computer program according to another preferred embodiment of the present invention is a computer program which causes a computer to operate as an engine sound synthesizer for synthesizing an engine sound. The computer includes a storage unit which stores therein engine sound data entities as source data. The computer program causes the computer to function as a driving state specification information receiving unit which receives driving state specification information specifying a driving state of a virtual engine, a synthesizing unit which generates synthetic sound data by selectively reading the engine sound data entities out of the storage unit and selectively combining the read engine sound data entities, a fluctuating unit which imparts a sound pressure fluctuation to the synthetic sound data generated by the synthesizing unit to generate fluctuated synthetic engine sound data, and a fluctuation width controlling unit which controls the width of the sound pressure fluctuation to be imparted to the synthetic sound data by the fluctuating unit on the basis of the driving state specification information received by the driving state specification information receiving unit.

The computer program is run on the computer, whereby the computer functions as the above-described second engine sound synthesizer.

The driving state of the virtual engine may be defined by parameters including a throttle opening degree and an engine rotation speed. Accordingly, the driving state specification information preferably includes information related to the throttle opening degree and the engine rotation speed.

A recording medium according to yet a further preferred embodiment of the present invention contains a computer program recorded therein and having either of the above-described configurations. The computer program recorded in the recording medium is read and run by a computer, whereby the computer functions as either of the above-described engine sound synthesizers. The computer program may be recorded in a compressed form. The recording medium may be operative by a recording system, and examples thereof include a semiconductor memory, a magnetic recording medium, an optical recording medium and a magneto-optical recording medium. More specifically, the recording medium may be in the form of a nonvolatile memory incorporated in a motor vehicle or a game machine. The nonvolatile memory may be a ROM or a rewritable memory (e.g., EEPROM).

A game program according to another preferred embodiment of the present invention incorporates a sound synthesizing computer program having either of the above-described configurations. The game program is run on a computer connected to an operation section and an output section (which outputs a sound on the basis of sound signals), whereby the computer is operative as a game machine. In this case, the computer operative as the game machine can generate a synthetic sound that is very close to the actual engine sound, thereby enhancing verisimilitude provided by the game.

The foregoing and other elements, features, steps, characteristics and advantages of the present invention will become more apparent from the following detailed description of the preferred embodiments with reference to the attached drawings.

DETAILED DESCRIPTION OF PREFERRED EMBODIMENTS

First Preferred Embodiment

Figure 1:
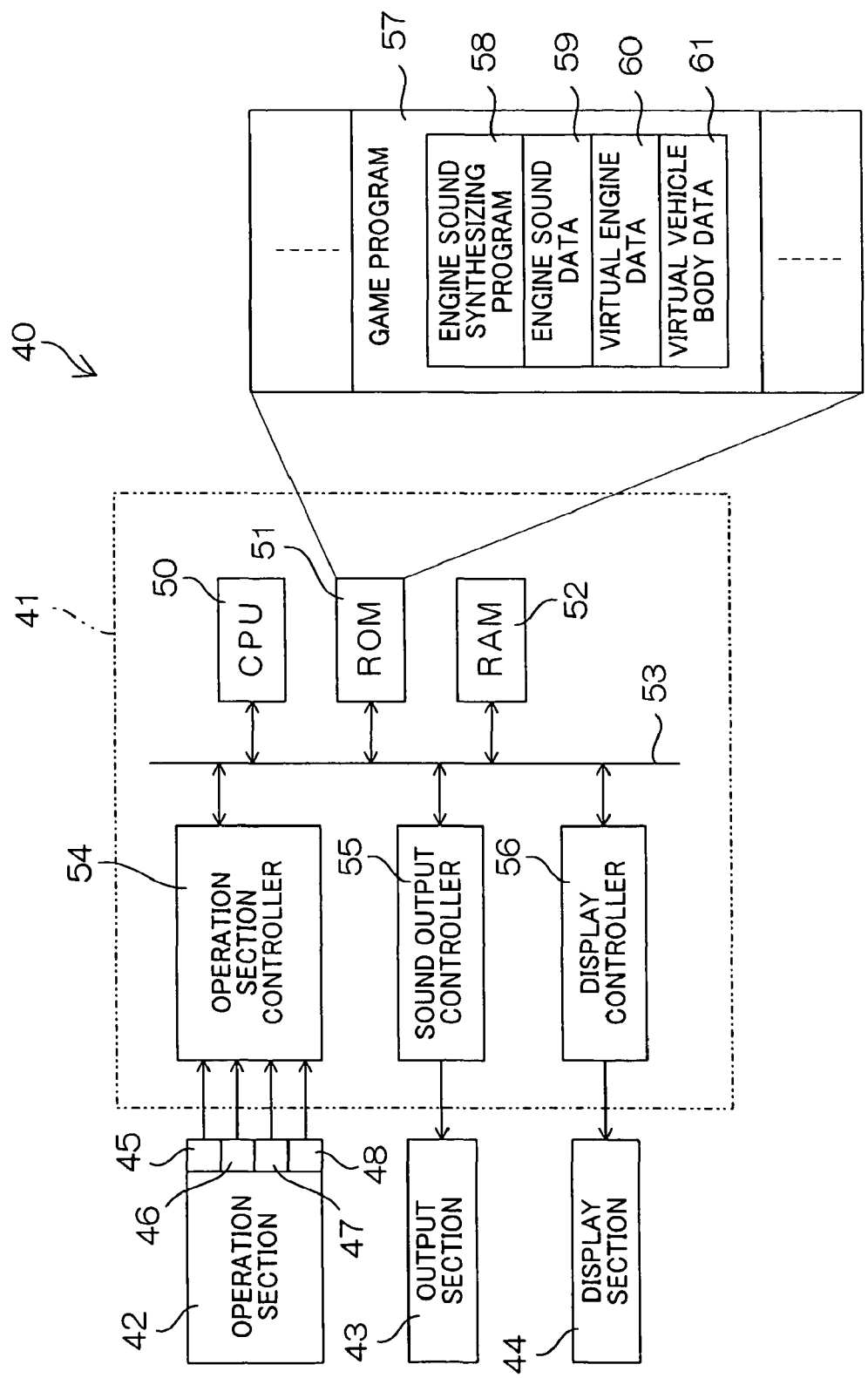
FIG. 1 is a block diagram for explaining the electrical construction of a game machine to which an engine sound synthesizer according to a first preferred embodiment of the present invention is applied.

FIG. 1 is a block diagram for explaining the electrical construction of a game machine 40 to which an engine sound synthesizer according to a first preferred embodiment of the present invention is applied. The game machine 40 may be designed for an automotive racing game (a motorcycle or car racing game, for example), or for a driving simulation. In the game machine 40, the engine sound synthesizer according to the first preferred embodiment of the invention is provided to greatly improve the realistic sensation and the verisimilitude.

The game machine 40 includes a game machine body 41 having a basic construction of a computer. The game machine body 41 is connected to an operation section 42, an output section 43 and a display section 44.

The game machine 40 may be a so-called arcade game machine such as for a racing game or a driving simulation. Where the game machine 40 simulates a motorcycle, the operation section 42 includes a steering handle, an accelerator grip, a brake pedal (and/or a brake lever) and a shift pedal. Where the game machine 40 simulates a four-wheeled motor vehicle, the operation section 42 includes a steering wheel, an accelerator pedal, a brake pedal and a shift lever.

In this case, the operation section 42 further includes a steering angle sensor 45 which detects the operation amount of the steering handle or the steering wheel and outputs steering angle information, an accelerator operation amount sensor 46 which detects the operation amount of the accelerator grip or the accelerator pedal and outputs the detected accelerator operation amount, a brake operation amount sensor 47 which detects the operation amount of the brake pedal (and/or the brake lever) and outputs the detected brake operation amount, and a transmission sensor 48 which detects the shift position of the shift pedal or the shift lever and outputs the detected shift position. Output signals of these sensors 45 to 48 are input to the game machine body 41.

The output section 43 includes an amplifier and a speaker. The output section 43 receives sound signals supplied from the game machine body 41, and outputs a sound on the basis of the sound signals. The speaker is located in a position such that a player can hear the outputted sound. In general, the speaker is disposed in front of the sitting position of the player. Where the game machine 40 simulates the motorcycle, the speaker may be incorporated in a helmet to be worn by the player.

The display section 44 is disposed in front of the sitting position of the player. The display section 44 displays a video image simulating a scene to be observed by a driver of the motor vehicle during the actual driving, when the player plays the game.

The game machine body 41 has a CPU 50, a ROM 51 and a RAM 52, and a bus 53 connected to the CPU 50, the ROM 51 and the RAM 52. The bus 53 is further connected to an operation section controller 54 which receives the inputs of the sensors 45 to 48 of the operation section 42, a sound output controller 55 which applies the sound signals to the output section 43, and a display controller 56 which applies display signals to the display section 44.

The ROM 51 is a recording medium which contains a game program 57 recorded therein as a computer program. An engine sound synthesizing program (computer program) 58, engine sound data 59, virtual engine data 60 and virtual vehicle body data 61 are incorporated in the game program 57. The engine sound data 59, the virtual engine data 60 and the virtual vehicle body data 61 are used by the engine sound synthesizing program 58. The engine sound data 59 is prepared by preliminarily recording an actual engine sound and extracting engine sound segments in predetermined time frames from the recorded engine sound. The virtual engine data 60 is prepared by recording the output characteristics of the engine, and the like. The virtual vehicle body data 61 is prepared by recording the traveling resistance of the motor vehicle, and the like.

The CPU 50 executes the game program 57 recorded in the ROM 51 while utilizing a memory area of the RAM 52 as a work area. Thus, the CPU 50 controls the sound output controller 55 and the display controller 56 on the basis of the signals input from the operation section 42 according to the game program 57. When the CPU 50 executes the engine sound synthesizing program 58 incorporated in the game program 57, the game machine body 41 functions as the engine sound synthesizer.

Figure 2:
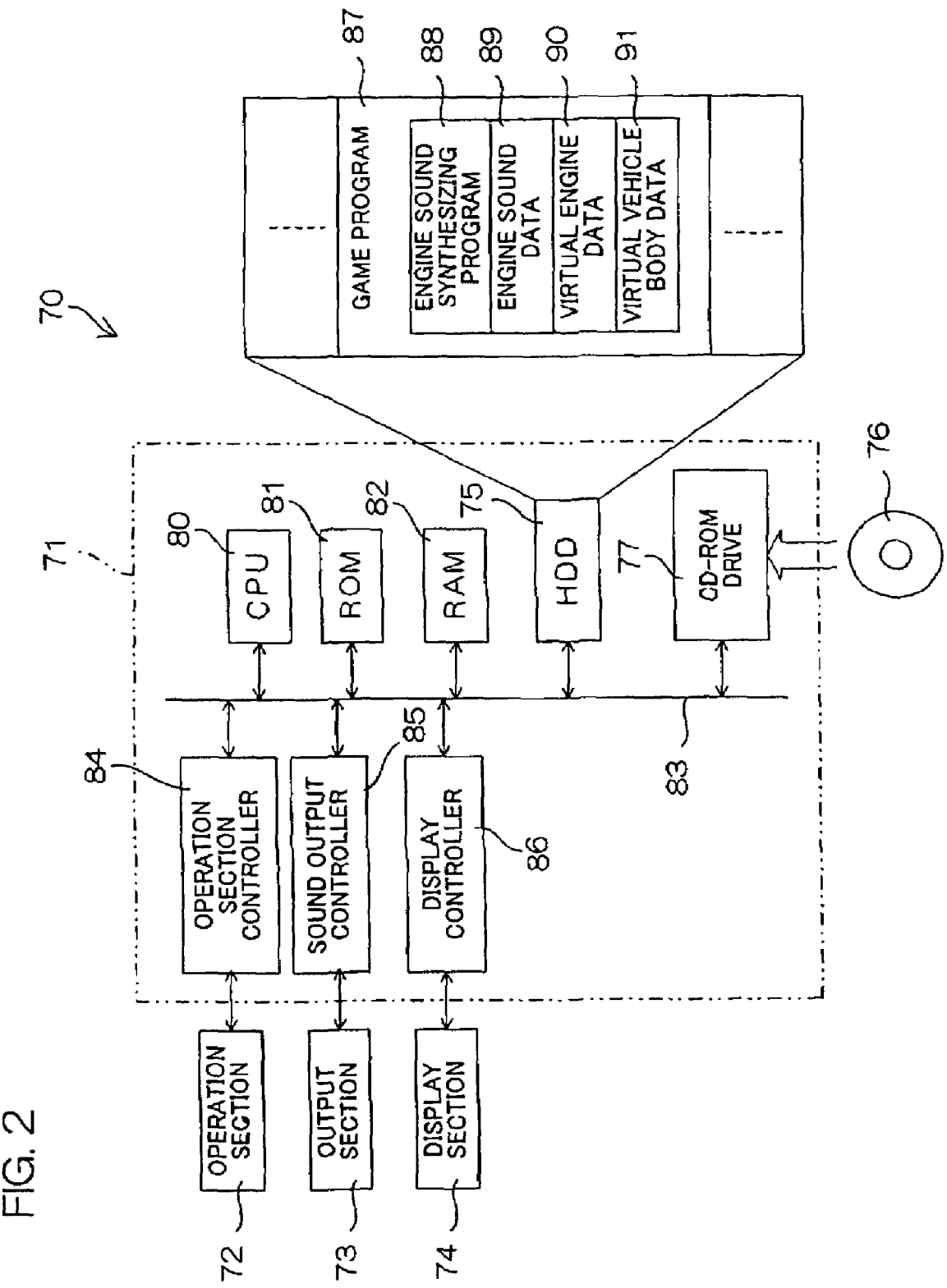
FIG. 2 is a block diagram for explaining the electrical construction of a personal computer which can be used for the game machine according to the first preferred embodiment of the present invention.

FIG. 2 is a block diagram for explaining the electrical construction of a personal computer 70 which can be used for the game machine according to this preferred embodiment. The personal computer 70 includes a computer body 71. An operation section 72, an output section 73 and a display device 74 are connected to the computer body 71. The operation section 72 may include a keyboard and a mouse, or may be an input device for the game (e.g., a joy stick, an input device for the driving simulation, or the like). The output section 73 includes, for example, an amplifier and a speaker, and outputs a sound on the basis of sound signals supplied from the computer body 71. The display device 74 may be a CRT or a liquid crystal display device, and displays an image on the basis of image signals supplied from the computer body 71.

The computer body 71 has a CPU 80, a ROM 81 and a RAM 82, and a bus 83 connected to the CPU 80, the ROM 81 and the RAM 82. The bus 83 is further connected to an operation section controller 84 which receives inputs from the operation section 72, a sound output controller 85 which applies the sound signals to the output section 73, and a display controller 86 which applies display signals to the display section 74.

The bus 83 is further connected to a hard disk drive (HDD) 75 as a magnetic recording medium, and a CD-ROM drive 77 which is capable of reading a CD-ROM 76 as an optical recording medium.

A game program 87 is recorded in the CD-ROM 76. By loading the CD-ROM 76 in the CD-ROM drive 77 and causing the CD-ROM drive 77 to read the CD-ROM 76, the game program 87 is installed in a memory area of the hard disk drive 75. An engine sound synthesizing program (computer program) 88, engine sound data 89, virtual engine data 90 and virtual vehicle body data 91 are incorporated in the game program 87 as in the case of the game machine 40.

The CPU 80 executes the game program 87 recorded in the hard disk drive 75 while utilizing a memory area of the RAM 82 as a work area. Thus, the CPU 80 controls the sound output controller 85 and the display controller 86 on the basis of signals input from the operation section 72 according to the game program 87. When the CPU 80 executes the engine sound synthesizing program 88 incorporated in the game program 87, the computer body 71 functions as the engine sound synthesizer.

The CPU 80 executing the game program 87 detects a first predetermined operation (e.g., a first predetermined key operation), a second predetermined operation (e.g., a second predetermined key operation) and a third predetermined operation (e.g., a third predetermined key operation) performed in the operation section 72 as a steering operation, an accelerator operation and a shift lever operation, respectively. In this case, the operation section 72 functions as a driving operation section for inputting a driving state.

The game machine may be constructed as a so-called home TV game machine. The TV game machine is similar in construction to the computer shown in FIG. 2. However, the operation section is constituted by a game-oriented operation device having press buttons and an operation lever.

Figure 3:
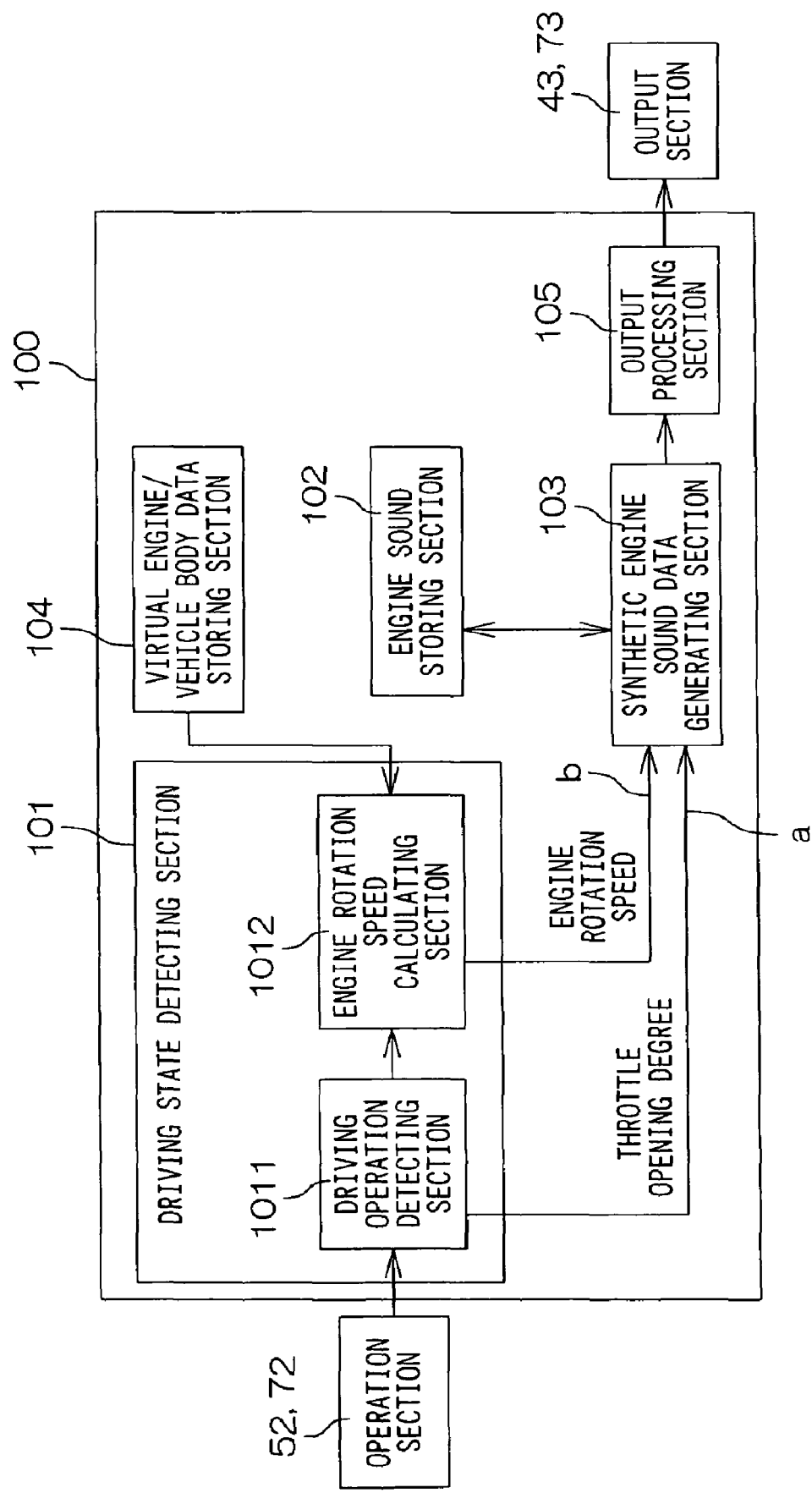
FIG. 3 is a block diagram for explaining the construction of the engine sound synthesizer according to the first preferred embodiment of the present invention.

FIG. 3 is a block diagram for explaining the construction of the engine sound synthesizer 100 embodied by the engine sound synthesizing program 58, 88 executed by the CPU 50, 80 in the arrangement shown in FIG. 1 or 2.

The engine sound synthesizer 100 includes a driving state detecting section 101, an engine sound storing section 102, a synthetic engine sound data generating section 103, a virtual engine/vehicle body data storing section 104 and an output processing section 105.

The engine sound storing section 102 is provided in a memory area of the ROM 51 of the game machine 40 or the hard disk drive 75 of the personal computer 70, and functions as a storage unit which stores the engine sound data 59, 89.

The virtual engine/vehicle body data storing section 104 is also provided in a memory area of the ROM 51 of the game machine 40 or the hard disk drive 75 of the personal computer 70, and stores therein the virtual engine data 60, 90 and the virtual vehicle body data 61, 91.

The driving state detecting section 101 is a functional processing section embodied by the game program 57, 87 executed by the CPU 50, 80, and functions as a driving state specification information receiving unit. The driving state detecting section 101 has a driving operation detecting section 1011 and an engine rotation speed calculating section 1012.

The driving operation detecting section 1011 determines a driving operation amount on the basis of signals input from the operation section 42, 72 by a driving operator, and outputs a driving operation signal. The driving operation signal is indicative of a virtual throttle opening degree and a virtual shift position according to the operation amounts in the operation section 42, 72. The driving operation signal is applied to the engine rotation speed calculating section 1012.

The engine rotation speed calculating section 1012 calculates a virtual engine rotation speed which provides a proper balance between the engine output and the traveling resistance on the basis of the driving operation signal from the driving operation detecting section 1011 and the engine output characteristic data and the vehicle traveling resistance data preliminarily recorded in the virtual engine/vehicle body data storing section 104.

The synthetic engine sound data generating section 103 is a functional processing section embodied by the engine sound synthesizing program 58, 88 executed by the CPU 50, 80. The synthetic engine sound data generating section 103 receives throttle opening degree data a out of the driving operation signal from the driving operation detecting section 1011, and engine rotation speed data b from the engine rotation speed calculating section 1012. On the basis of the throttle opening degree data a and the engine rotation speed data b, the synthetic engine sound data generating section 103 combines data entities of the engine sound data stored in the engine sound storing section 102 to generate synthetic engine sound data.

The output processing section 105 preferably corresponds to the sound output controller 55, 85, and includes a digital/analog (D/A) converter which converts the synthetic engine sound data generated by the synthetic engine sound data generating section 103 into analog sound signals. The analog signals from the output processing section 105 are applied to the output section 43, 73, whereby a synthetic engine sound is outputted.

Figure 4:
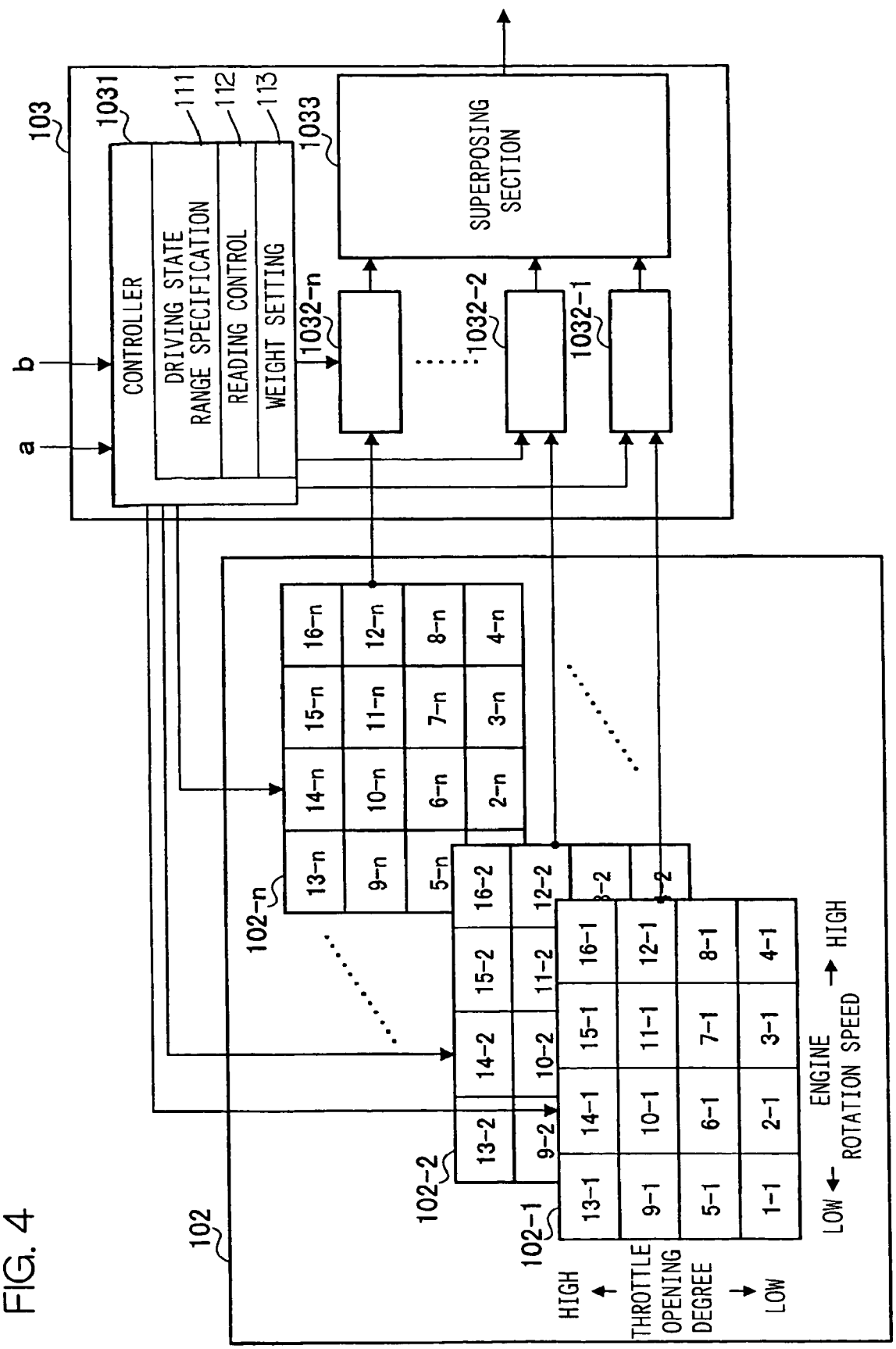
FIG. 4 is a block diagram for explaining the engine sound data storage configuration of an engine sound storing section and the specific construction of a synthetic engine sound data generating section.

FIG. 4 is a block diagram for explaining the engine sound data storage configuration of the engine sound storing section 102 and the specific construction of the synthetic engine sound data generating section 103. The engine sound storing section 102 stores therein tables containing engine sound data entities in association with the engine rotation speed and the throttle opening degree. More specifically, the driving state of a virtual engine defined by the engine rotation speed and the throttle opening degree which are preferably used as parameters is divided into a plurality of driving state ranges (16 driving state ranges 1 to 16 in this preferred embodiment) on the basis of the parameters (see FIG. 7). In correspondence with the respective driving state ranges 1 to 16, a total of 16 groups of plural engine sound data entities (n engine sound data entities wherein n is a natural number of n≧2) 1-1, 1-2, . . . , 1-n; 2-1, 2-2, 2-n; 3-1, 3-2, . . . , 3-n; . . . ; 16-1, 16-2, . . . , 16-n are stored in the engine sound storing section 102.

The driving state range 1 corresponds to an engine idling state, and the driving state range 16 corresponds to a maximum output state.

In the exemplary storage configuration of FIG. 4, n tables 102-1 to 102-n each contain engine sound data entities corresponding to the respective driving state ranges 1 to 16. Alternatively, n engine sound data entities maybe stored in a memory area corresponding to each of the driving state ranges 1 to 16 in a single table form.

Different numbers (different sample numbers) of engine sound data entities may be stored in correspondence with the respective driving state ranges 1 to 16. More specifically, a greater number of engine sound data entities are preferably sampled for a driving state range with a smaller throttle opening degree and a lower engine rotation speed than for a driving state range with a greater throttle opening degree and a higher engine rotation speed. For example, the sample number for the driving state range 1 corresponding to the idling state is preferably greater than the sample number for the driving state range 16 corresponding to the maximum output state.

This is because the operation of the actual engine is generally unstable in a driving state with a smaller throttle opening degree and a lower engine rotation speed. In this driving state, the actual engine sound widely varies with a high degree of indefiniteness. Therefore, a greater sample number of engine sound data entities are required for reproducing such a high degree of indefiniteness with fidelity.

Particularly in the case of a 2-cycle engine in which combustion occurs once during one rotation of a crank shaft, abnormal combustion is liable to occur in the idling state. Therefore, it is effective to increase the sample number for the driving state range corresponding to the idling sate.

The synthetic engine sound data generating section 103 specifies one of the driving state ranges on the basis of the throttle opening degree data a received from the driving operation detecting section 1011 and the engine rotation speed data b received from the engine rotation speed calculating section 1012. Then, the synthetic engine sound data generating section 103 selectively reads plural engine sound data entities corresponding to the specified driving state range from the engine sound storing section 102, and selectively combines the read engine sound data entities to generate the synthetic engine sound data.

Figure 5:
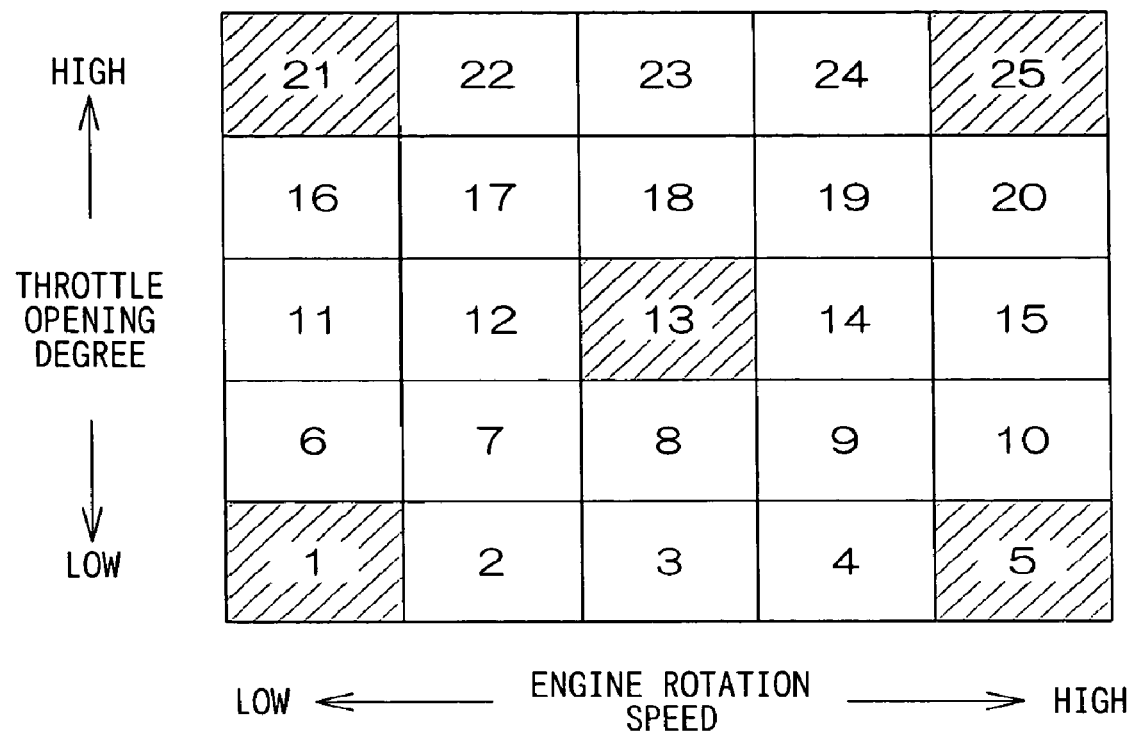
FIG. 5 is a diagram for explaining driving state ranges defined on the basis of a throttle opening degree and an engine rotation speed used as parameters, and an engine sound data interpolating process.

The tables in the engine sound storing section 102 are not necessarily required to be preliminarily completed. Where 25 driving state ranges are provided in each table as shown in FIG. 5, for example, data entities of an actually recorded engine sound are stored only in correspondence with a driving state range 1 (for the idling state with a minimum throttle opening degree and a minimum engine rotation speed), a driving state range 5 (with a minimum throttle opening degree and a maximum engine rotation speed), a driving state range 21 (with a maximum throttle opening degree and a minimum engine rotation speed) and a driving state range 25 (for the maximum output state with a maximum throttle opening degree and a maximum engine rotation speed) located in four corners of the table, and a central driving state range 13.

Engine sound data entities for the other driving state ranges are computed by interpolation with the use of the engine sound data entities for the driving state ranges 1, 5, 13, 21, 25. The interpolative computation may be performed in a preparatory process (initialization process) for the execution of the game program or as occasion requires. Where no engine sound data entities are stored for a driving state range defined by a throttle opening degree and an engine rotation speed specified by the driving state detecting section 101, for example, the synthetic engine sound data generating section 103 may perform the interpolative computation with the use of engine sound data entities stored in correspondence with other driving state ranges in the engine sound storing section 102. In this case, the synthetic engine sound data generating section 103 combines engine sound data entities prepared through the interpolative computation to generate the synthetic engine sound data.

Referring back to FIG. 4, the synthetic engine sound data generating section 103 includes a controller 1031, weighting sections 1032-1 to 1032-n (hereinafter referred to generally as "weighting sections 1032") which respectively weight the engine sound data entities applied from the engine sound storing section 102, and a superposing section 1033 as a superposing unit which superposes the engine sound data entities respectively weighted by the weighting sections 1032. These sections are functional processing sections embodied by the engine sound synthesizing program 58, 88 executed by the CPU 50, 80.

The number of the weighting sections 1032 is equal to the number n of the engine sound data entities stored in correspondence with each of the driving state ranges in the engine sound storing section 102.

The controller 1031 includes a driving state range specifying section 111 which receives the throttle opening degree data a and the engine rotation speed data b and specifies one of the driving state ranges on the basis of the throttle opening degree data a and the engine rotation speed data b. The controller 1031 further includes a reading controlling section 112 which applies an output command signal to the engine sound storing section 102 for outputting some or all of the engine sound data entities corresponding to the specified driving state range to the corresponding weighting sections 1032. Where the driving state range 1 is specified, for example, the engine sound data entities 1-1 to 1-n corresponding to the driving state range 1 are read out of the respective tables 102-1 to 102-n, and applied to the respective weighting sections 1032-1 to 1032-n.

The reading controlling section 112 is not necessarily required to read all the engine sound data entities corresponding to the specified driving state range from the engine sound storing section 102. That is, the controller 1031 may arbitrarily select tables from which engine sound data entities are to be read out, and apply an output command signal including information indicative of the selected tables to the engine sound storing section 102.

The controller 1031 further includes a weight setting section 113 which determines weights to be assigned to the engine sound data entities in the respective weighting sections 1032. The weighting sections 1032 respectively weight the engine sound data entities on the basis of the weights received from the controller 1031, and apply the weighted engine sound data entities to the superposing section 1033. The superposing section 1033 receives the weighted engine sound data entities from the respective weighting sections 1032, and superposes the weighted engine sound data entities to generate synthetic sound data, which is in turn outputted to the output processing section 105. The weighting sections 1032 perform a sound pressure amplifying process on the respective engine sound data entities according to the weights determined by the controller 1031.

An explanation will be given to a process to be performed by the synthetic engine sound data generating section 103 for combining the engine sound data entities.

It is now assumed, for example, that the controller 1031 outputs an output command signal to the engine sound storing section 102 for outputting an engine sound data entity from only one table. The controller 1031 specifies one table at a time, but successively specifies different tables at random in a cycle according to the engine rotation speed to cause the engine sound storing section 102 to successively output engine sound data entities from the specified tables. The controller 1031 assigns a weight of 1, for example, to the respective weighting sections 1032. In this case, the n engine sound data entities at the maximum corresponding to the driving state range specified by the throttle opening degree data a and the engine rotation speed data b are successively read out of the engine sound storing section 102 at random on a one-by-one basis and concatenated along a time axis to generate the synthetic engine sound data. That is, a time-axis based concatenation process is performed for concatenating the plural engine sound data entities along the time axis.

It is now assumed, for example, that the controller 1031 applies an output command signal to the engine sound storing section 102 for outputting engine sound data entities from two tables in parallel. The controller 1031 specifies one pair of tables at a time, but successively specifies different pairs of tables at random in a cycle according to the engine rotation speed to successively output engine sound data entities from the specified tables. The controller 1031 assigns a weight of 1, for example, to the respective weighting sections 1032. In this case, the n engine sound data entities at the maximum corresponding to the driving state range specified by the throttle opening degree data a and the engine rotation speed data b received by the controller 1031 are randomly read out of the engine sound storing section 102 and superposed on a pair-by-pair basis to generate sound superposition data entities. That is, a superposing process is performed for superposing each pair of engine sound data entities. The combination of two engine sound data entities to be superposed is changed in the cycle according to the engine rotation speed. The sound superposition data entities thus generated by the superposition of the different combinations of two engine sound data entities are sequentially concatenated along the time axis to generate the synthetic engine sound data. In this manner, the generation of the synthetic engine sound data is achieved by using the engine sound data superposing process and the time-axis based concatenation process in combination. Where the controller 1031 periodically specifies a predetermined pair of tables rather than successively specifies different pairs of tables at random, a sound superposition data entity prepared by superposing two engine sound data entities read out of the pair of tables is repeated for the generation of the synthetic engine sound data.

The controller 1031 can arbitrarily determine the engine sound data entities to be combined by the time-axis based concatenation process and/or the superposing process, the number of the engine sound data entities to be combined and the weights to be assigned to the engine sound data entities to be combined. Therefore, the synthetic engine sound data can be generated by any of various combining processes other than the above-described exemplary processes.

The controller 1031 may apply an output command signal to the engine sound storing section 102 for outputting the engine sound data entities corresponding to the driving state range defined by the throttle opening degree data a and the engine rotation speed data b received by the controller 1031 from all the tables. Then, the controller 1031 may assign a weight of 0 to some of the weighting sections 1032. In this case, engine sound data entities input to the weighting sections 1032 assigned a weight of 0 are unselected, and engine sound data entities input to the other weighting sections 1032 are selected for the generation of the synthetic engine sound data. Even with this arrangement, the generation of the synthetic engine sound data can be achieved by combining the engine sound data entities through the above-mentioned time-axis based concatenation process and the superposing process.

In this manner, the plural engine sound data entities are prepared for each of the driving state ranges, and selectively combined to generate the synthetic engine sound data. Thus, a synthetic engine sound having indefiniteness that is close to the actual engine sound can be generated.

With reference to FIGS. 6 to 10, an explanation will next be given of how to prepare the engine sound data entities to be contained in the tables 102-1 to 102-n in the engine sound storing section 102 in correspondence with the respective driving state ranges. For the preparation of the engine sound data entities, an actual engine sound is recorded while an actual engine is driven in different driving states. The engine sound is recorded in a digital data form. The recorded digital data is processed on a personal computer, whereby the engine sound data entities to be stored in the engine sound storing section 102 are prepared.

Figure 6:
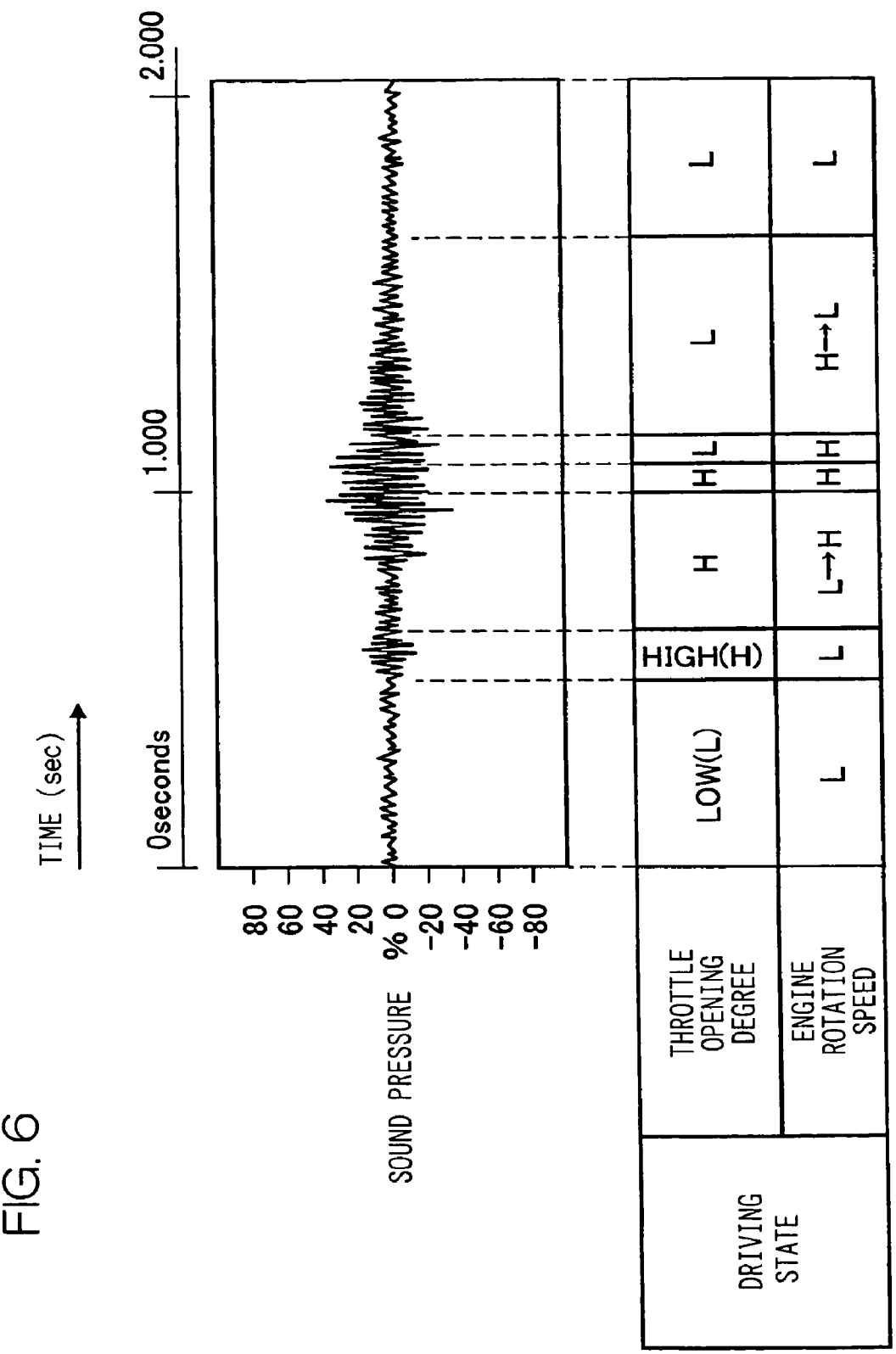
FIG. 6 is a diagram illustrating the waveform of an engine sound pressure recorded while an engine was idled.

FIG. 6 is a diagram illustrating the waveform of an engine sound pressure recorded while the engine was idled. More specifically, the waveform of the engine sound illustrated in FIG. 6 was recorded when abrupt acceleration and deceleration operations were performed in the engine idling state. In the abrupt acceleration and deceleration operations, the accelerator was abruptly heavily depressed in a neutral state without connection of the transmission to abruptly accelerate the engine rotation and kept at a predetermined operation amount, and then the throttle was abruptly closed. In FIG. 6, the throttle opening degree and the engine rotation speed are also shown for each segment of the recorded engine sound waveform.

Figure 7:
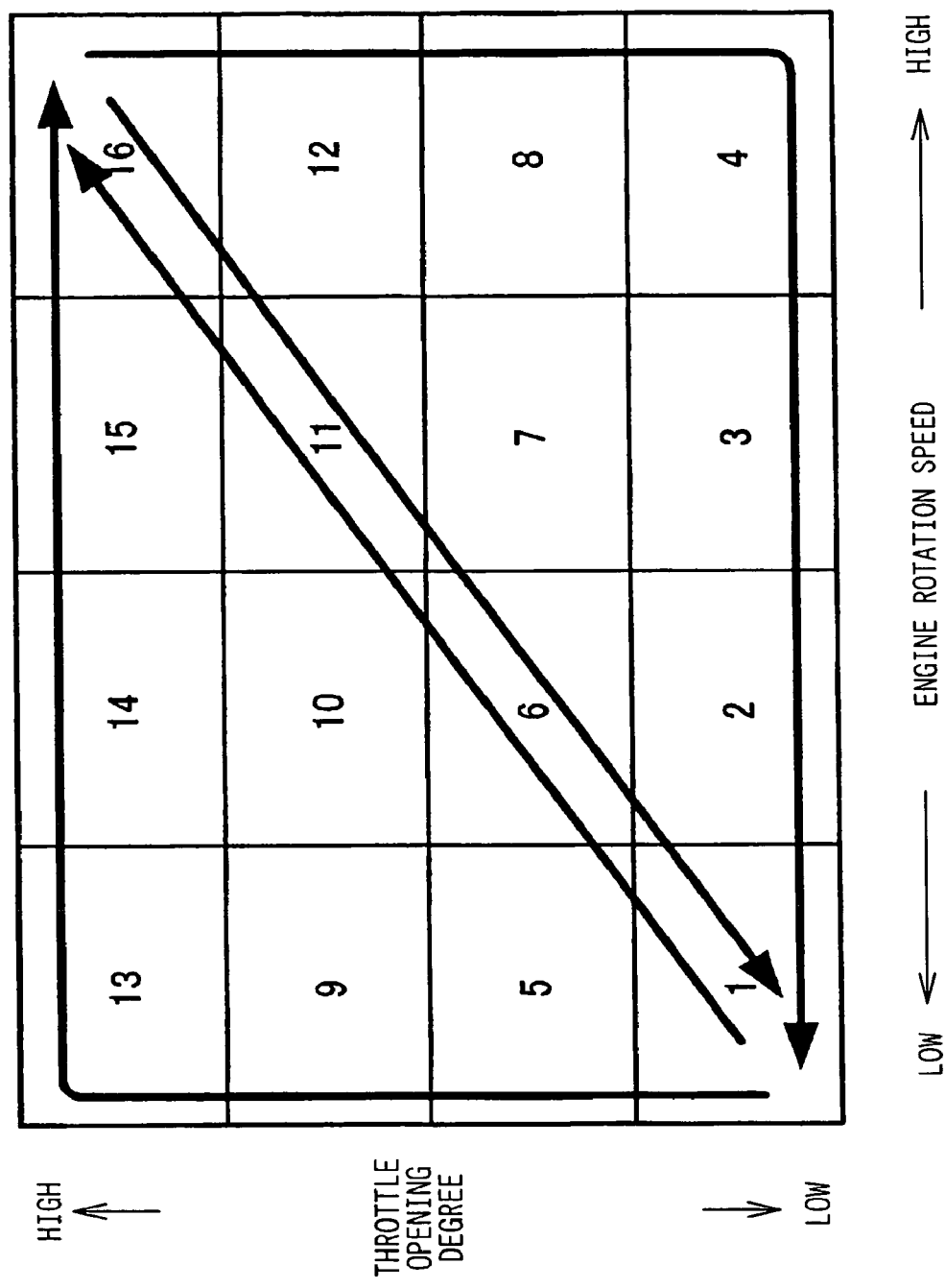
FIG. 7 is a diagram for explaining changes in driving state observed when abrupt acceleration and deceleration operations were performed and when the throttle opening degree was gradually increased and reduced.

FIG. 7 is a diagram for explaining changes in the driving state observed when the abrupt acceleration and deceleration operations were performed and when the throttle opening degree was gradually increased and reduced. In the abrupt acceleration and deceleration operations, the throttle opening degree and the engine rotation speed change differently due to the inertia of the rotary member of the engine. That is, when the throttle opening degree is changed by the operation of the accelerator, the engine rotation speed changes with a time lag behind the throttle opening degree. Therefore, the engine driving state changes from the driving state range 1 to the driving state ranges 5→9→13→14→15→16 in the abrupt acceleration operation. In the abrupt deceleration operation, the engine driving state changes from the driving state range 16 to the driving state ranges 12→8→4→3→2→1.

The digital data of the engine sound recorded when the abrupt acceleration and deceleration operations were performed is loaded onto the personal computer. An operator extracts data entities of engine sound segments corresponding to the respective driving state ranges from the digital data on the personal computer. The operator further extracts engine sound data entities of a predetermined unit (e.g., corresponding to one explosion or one combustion cycle) from each of the extracted engine sound segment data entities. The engine sound data entities thus extracted are stored in correspondence with the respective driving state ranges in the tables 102-1 to 102-n in the engine sound storing section 102.

Figure 8:
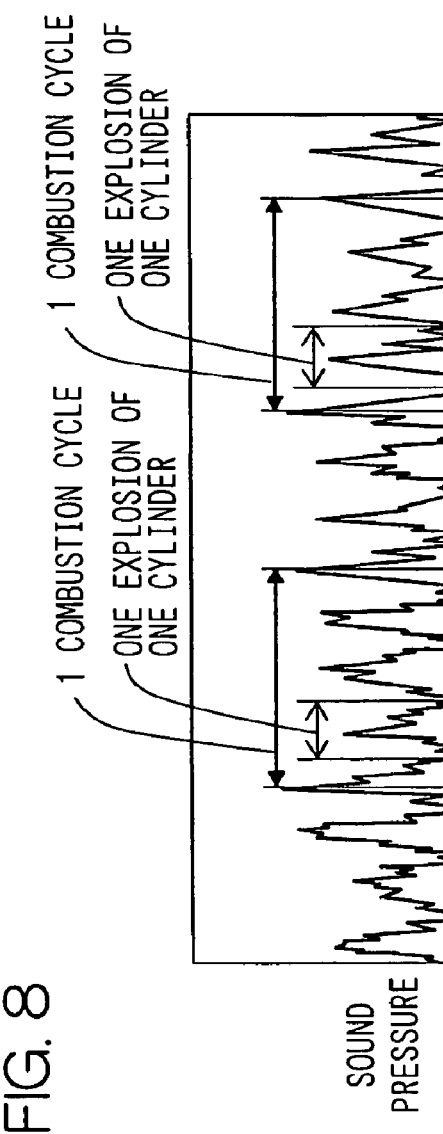
FIG. 8 is a diagram illustrating the waveform of the engine sound pressure of a 4-cycle 4-cylinder engine recorded in a certain driving state range.

FIG. 8 illustrates the waveform of the engine sound pressure of a 4-cycle 4-cylinder engine recorded in a certain driving state range. In a driving state with virtually no variations in the throttle opening degree and the engine rotation speed, the sound pressure waveform does not significantly vary. Therefore, the engine sound pressure in each of the driving state ranges have substantially the same value at peaks thereof, and the engine sound has a series of sound pressure waveforms as shown in FIG. 8. A time frame containing one peak of the sound pressure waveform corresponds to one explosion of one cylinder. Therefore, the operator extracts an engine sound data entity for one peak from each of the engine sound segments corresponding to the respective driving state ranges, while checking the sound pressure waveform on the personal computer. Thus, the engine sound data entity for one explosion is extracted.

The operator repeatedly performs the above-described operation on the personal computer, whereby a desired number of engine sound data entities each having a length equivalent to one explosion of one cylinder are extracted at desired positions (on the time axis) from the extracted engine sound segment data entities and stored in correspondence with the driving state ranges. Thus, the tables to be stored in the engine sound storing section 102 are prepared on the personal computer.

FIG. 8 also illustrates the tables 102-1, 102-n in which engine sound data entities Wa, Wb (each corresponding to one explosion of one cylinder) extracted from an engine sound segment corresponding to a certain driving state range are stored as the engine sound data entities 1-1, 1-n. The actual engine sound slightly varies from one explosion to another with a slight fluctuation (indefiniteness) even in a constant driving state. Therefore, the engine sound data varies depending on the position at which the data is extracted. Hence, the engine sound data entities Wa and Wb are similar, but slightly different.

In this preferred embodiment, the extracted engine sound data entities each preferably have a length equivalent to one explosion of one cylinder. This is because the storage capacity requirement of the engine sound storing section 102 of the engine sound synthesizer 100 can be reduced by thus reducing the size of each of the data entities to be stored. However, one combustion cycle of a 4-cylinder engine corresponds to four consecutive peaks in the engine sound pressure wave form, and is the basic cycle of the engine sound. In view of this, where the engine sound of the 4-cycle 4-cylinder engine is recorded, engine sound data entities each having a length equivalent to one combustion cycle (an interval containing four consecutive peaks in FIG. 8) may be extracted from the engine sound. Further, engine sound data entities each having a length equivalent to plural peaks may be extracted from the engine sound and stored in the engine sound storing section 102. Similarly, engine sound data entities each having a length equivalent to a multiple of one combustion cycle may be extracted from the engine sound and stored in the engine sound storing section 102.

The data extraction positions (on the time axis) at which the engine sound data entities each having a length equivalent to one combustion cycle are extracted may be arbitrarily determined. The data extraction positions may be selected at random or regularly (e.g., periodically).

In the above-described manner, the engine sound data entities for the driving state ranges 5, 9, 13, 14, 15, 16, 12, 8, 4, 3, 2, 1 in the tables in the engine sound storing section 102 are prepared from the engine sound recorded when the engine is idled once.

Although the explanation has been given of how to prepare the engine sound data entities for the driving state ranges located at peripheral positions of the tables to be stored in the engine sound storing section 102, engine sound data entities can be prepared for all the driving state ranges by changing the accelerator operation amount in the abrupt acceleration operation.

Figure 9:
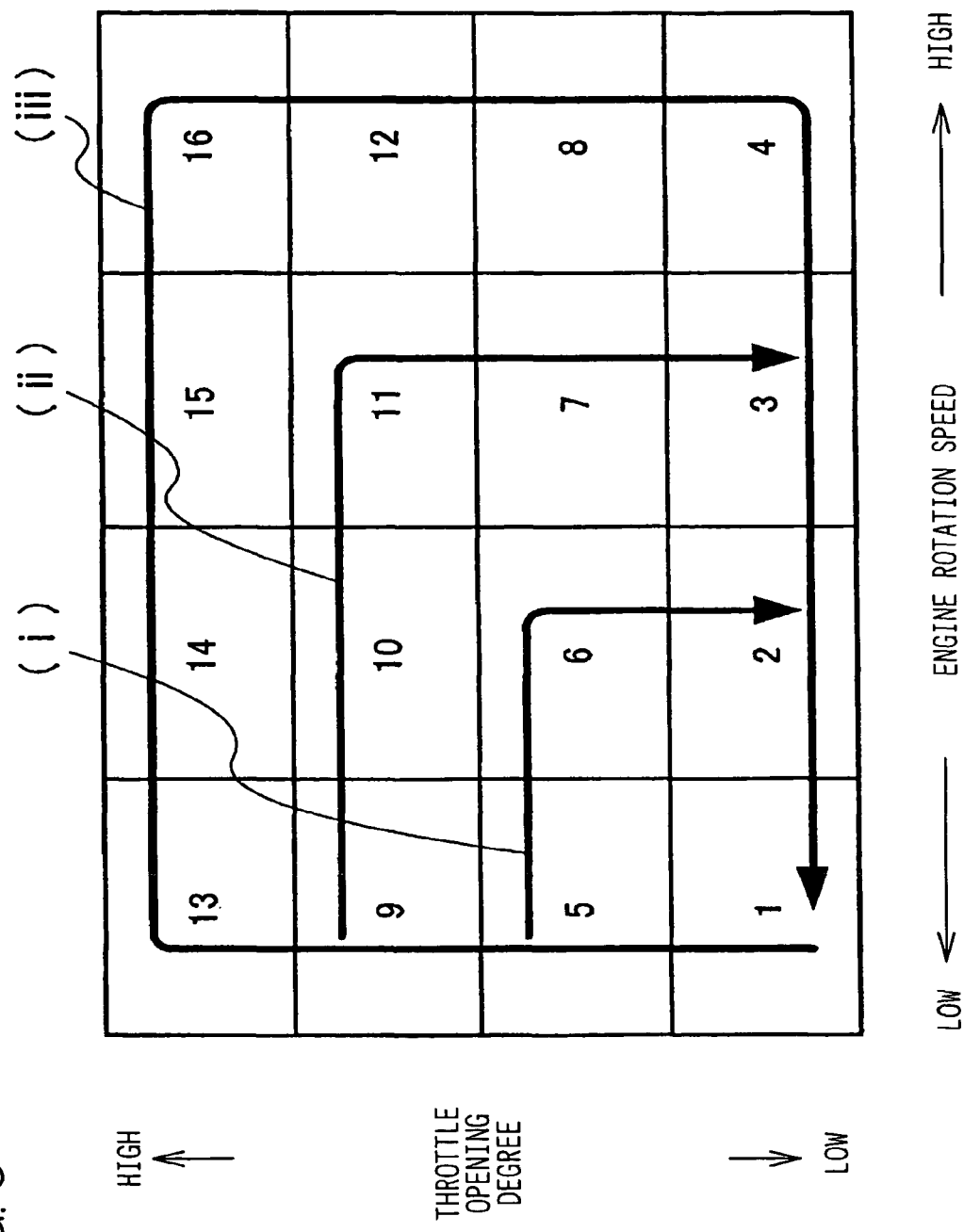
FIG. 9 is a diagram illustrating changes in driving state observed when the abrupt acceleration and deceleration operations were performed while the engine was idled with a maximum throttle opening degree being variably set.

FIG. 9 is a diagram illustrating changes in the driving state observed when the abrupt acceleration and deceleration operations were performed while the engine was idled with a maximum throttle opening degree being variably set. More specifically, the changes in the driving state shown in FIG. 9 were observed when the abrupt acceleration and deceleration operations were performed with the maximum throttle opening degree being set at: (i) 3/8; (ii) 5/8; and (iii) 7/8. In the case (ii) where the abrupt acceleration and deceleration operations were performed by abruptly depressing the accelerator to a throttle opening degree of ⅝ for abrupt acceleration, then keeping the accelerator at the constant operation amount and abruptly closing the throttle, for example, engine sound data entities can be prepared for the driving state ranges 1, 5, 9, 10, 11, 7, 3, 2.

Further, it is possible to prepare engine sound data entities for all the driving state ranges by idling the engine while depressing the accelerator gradually rather than abruptly with the throttle opening degree being variably adjusted.

Where the engine sound is recorded while the motor vehicle is actually driven, a wind hissing sound is inevitably recorded. Further, where the engine sound is recorded while the motor vehicle is driven on a chassis dynamo, a noise such as a roller sound is inevitably recorded. On the contrary, the above-described method in which the engine sound data entities are prepared from the engine sound recorded in the idling state is free from the wind hissing sound and the other noises. Therefore, the use of the engine sound data entities thus prepared makes it possible to generate a synthetic sound very close to the actual engine sound.

Alternatively, the tables to be stored in the engine sound storing section 102 may be prepared in the following manner.

Figure 10:
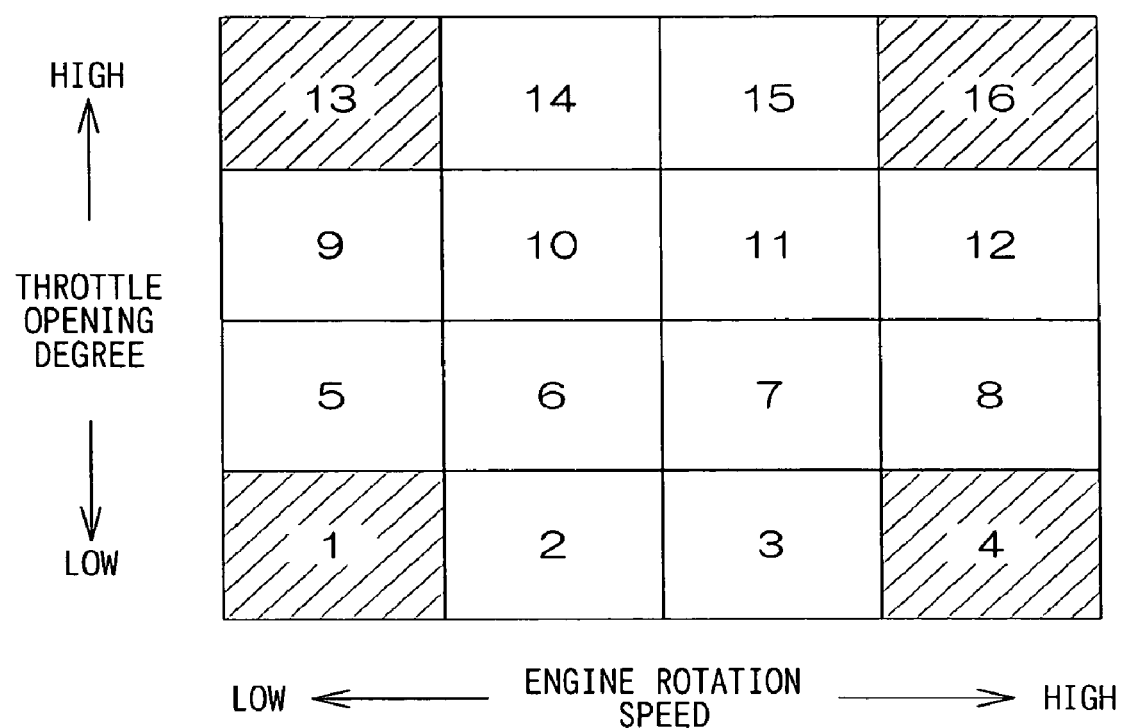
FIG. 10 is a schematic diagram of a table to be stored in the engine sound storing section.

FIG. 10 is a schematic diagram of a table to be stored in the engine sound storage section 102. Engine sound data entities for the driving state ranges 1, 4, 13, 16 (hatched driving state ranges located in the four corners of the table) shown in FIG. 10 are first prepared by the above-described engine sound data preparing method, and stored in the engine sound storing section 102. Then, engine sound data entities for the other driving state ranges are prepared by interpolation with the use of these four engine sound data entities.

More specifically, engine sound data entities for the driving state ranges located at the peripheral positions of the table are preferably determined by interpolation. An engine sound data entity for the driving state range 5, for example, is determined by interpolation with the use of the engine sound data entities for the driving state ranges 1, 13. In this case, the driving state range 5 is closer to the driving state range 1, so that a greater weight is assigned to the engine sound data entity for the driving state range 1 in the interpolation. In this manner, the engine sound data entities for the driving state ranges located at the peripheral positions of the table are prepared.

With the use of the engine sound data entities thus prepared, engine sound data entities for the other driving state ranges are determined by interpolation. An engine sound data entity for the driving state range 7, for example, is determined by interpolation with the use of the engine sound data entities for the driving state ranges 5, 8, the engine sound data entities for the driving state ranges 3, 15, or all of these engine sound data entities. As in the aforesaid case, the engine sound data entities are properly weighted in the interpolation.

Alternatively, engine sound data entities for the driving state ranges located on a diagonal line extending from the driving state range 1 to the driving state range 16 may be prepared by extracting engine sound data from the actually recorded engine sound, and engine sound data entities for the other driving state ranges may be determined by interpolation. Driving states in driving operations in which the accelerator is kept depressed at certain throttle opening degrees are stabilized in the driving state ranges located on the diagonal line extending from the driving state range 1 to the driving state range 16 (see FIG. 7). These driving states are stable, so that the engine sound can easily be recorded in these states.

The interpolative computation of the engine sound data entities for the driving state ranges having no actual data entities may be performed when the table of the engine sound data entities is prepared on the personal computer, or when the game machine or the like is initialized as described above. Alternatively, only the actual data entities may be stored in the engine sound storing section 102. In this case, an engine sound data entity for any of the driving state ranges having no actual data entities may be prepared by the interpolative computation when required.

The method for the preparation of the engine sound data entities has been described in connection to the engine sound of the automobile, but is applicable to the preparation of engine sound data entities for a motorcycle.

For the synthetic engine sound of the automobile and the synthetic engine sound of the motorcycle, an engine sound of a multi-cylinder engine is synthesized on the basis of engine sound data entities prepared from an engine sound of a single cylinder. That is, sounds from respective cylinders of the multi-cylinder engine are generated with a slight time lag. Therefore, the synthetic sound of the multi-cylinder engine can be generated by combining the engine sound data entities prepared from the engine sound of the single cylinder, more specifically, by superposing the engine sound data entities with a time lag.

Where the engine sound of the multi-cylinder engine is synthesized by combining the engine sound data entities prepared from the engine sound of the single cylinder, an interval of sounds to be generated from the respective cylinders can flexibly be controlled. For the generation of the synthetic engine sound of the motorcycle, for example, engine sounds of V-type engines having various bank angles can easily be synthesized.

One method for obtaining data of the engine sound of the single cylinder is to record an engine sound generated from a single-cylinder engine (e.g., a single-cylinder engine of the motorcycle). Engine sound data entities each having a length equivalent to one combustion cycle are extracted from the engine sound of the single-cylinder engine thus recorded, and used as engine sound data entities for each of the cylinders of the multi-cylinder engine.

Another method for obtaining data of the engine sound of the single cylinder is to extract an engine sound data entity in a time frame centering on a sound pressure peak and having a length equivalent to an interval between two adjacent peaks in FIG. 8 (corresponding to an engine sound segment for one of the four cylinders). Furthermore, another method is to extract an engine sound data entity in a time frame extending from a zero sound pressure point just before a sound pressure peak and having a length equivalent to an interval between two adjacent peaks. Where engine sound data entities are extracted at zero sound pressure points, the engine sound data entities can be combined seamlessly through the time-axis based concatenation process for the generation of the synthetic engine sound data. This method is applicable to both the automobile and the motorcycle.

Second Preferred Embodiment

Figure 11:
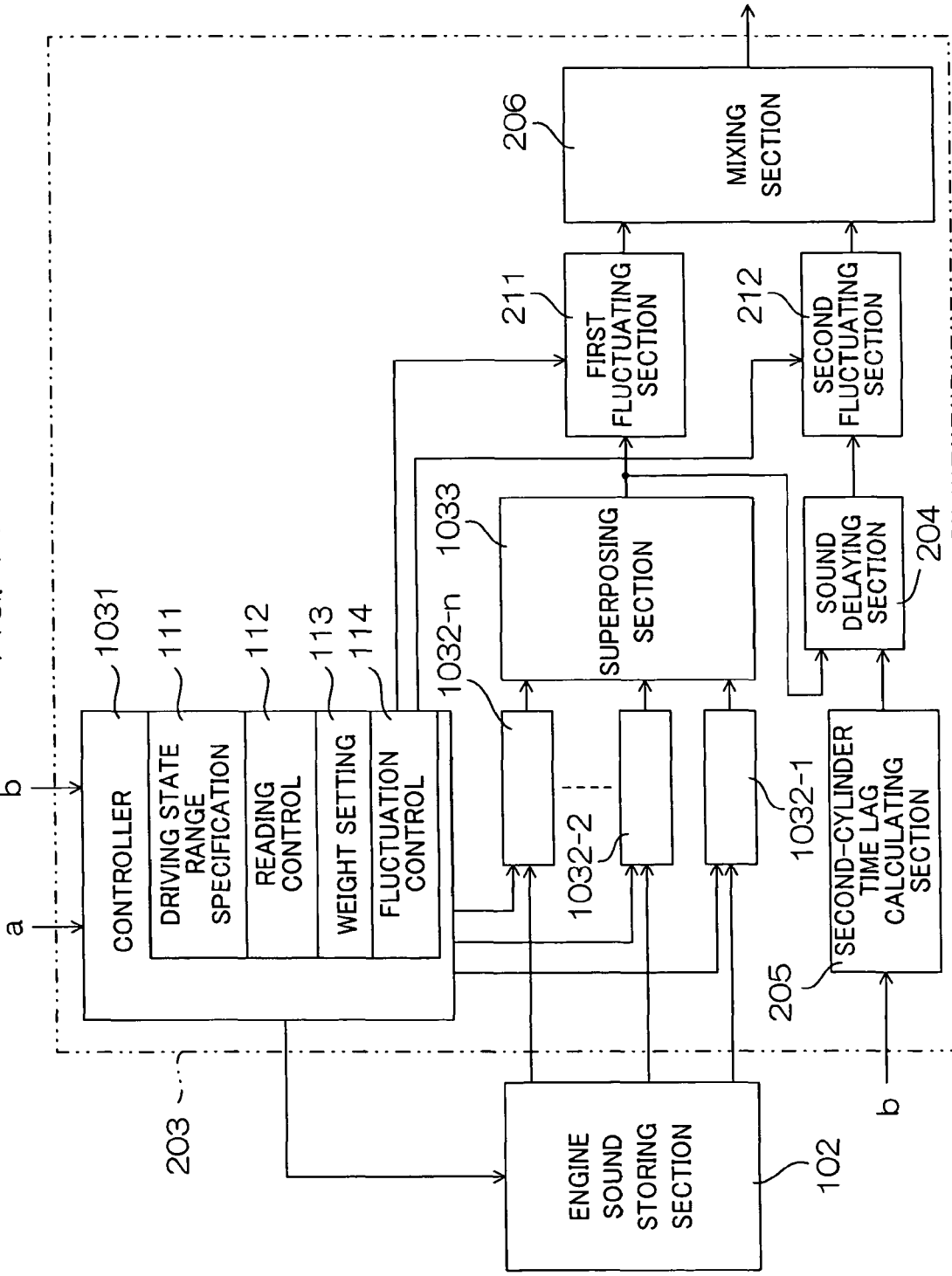
FIG. 11 is a block diagram for explaining the construction of an engine sound synthesizer according to a second preferred embodiment of the present invention, particularly illustrating the construction of a synthetic engine sound data generating section.

FIG. 11 is a block diagram for explaining the construction of an engine sound synthesizer according to a second preferred embodiment of the present invention, particularly illustrating the construction of a synthetic engine sound data generating section 203 which is used instead of the synthetic engine sound data generating section 103 in FIG. 3. In FIG. 11, components corresponding to those shown in FIG. 4 will be denoted by the same reference characters as in FIG. 4.

The engine sound synthesizer of this preferred embodiment is adapted to synthesize an engine sound of a two-cylinder engine having two cylinders, i.e., a first cylinder and a second cylinder. That is, the synthetic engine sound data generating section 203 includes, in addition to the arrangement shown in FIG. 4 (constituting a synthesizing unit which generates synthetic sound data for the first cylinder), a sound delaying section 204 as a delaying unit which delays the synthetic sound data generated by the superposing section 1033 by an inter-cylinder time lag and outputs the delayed synthetic sound data, a second-cylinder time lag calculating section 205 which determines the inter-cylinder time lag to be applied to the sound delaying section 204, and a mixing section 206 which superposes the synthetic sound data (first-cylinder synthetic engine sound data) generated by the superposing section 1033 and the synthetic sound data (second-cylinder synthetic engine sound data) generated by the sound delaying section 204 for mixing. The second-cylinder time lag calculating section 205 calculates the inter-cylinder time lag (a time lag of the second-cylinder engine sound with respect to the first-cylinder engine sound) on the basis of the engine rotation speed data b, and applies the inter-cylinder time lag to the sound delaying section 204. With this arrangement, the engine sound of the two-cylinder engine can be synthesized with the use of the single-cylinder engine sound data stored in the engine sound storing section 102.

In this preferred embodiment, a first fluctuating section 211 is interposed between the superposing section 1033 and the mixing section 206, and a second fluctuating section 212 is interposed between the sound delaying section 204 and the mixing section 206. The first fluctuating section 211 imparts a sound pressure fluctuation to the synthetic sound data generated by the superposing section 1033. Similarly, the second fluctuating section 212 imparts a sound pressure fluctuation to the synthetic sound data outputted from the sound delaying section 204.

The patterns and widths of the sound pressure fluctuations to be imparted by the first and second fluctuating sections 211, 212 are controlled by the controller 1031. The controller 1031 includes a fluctuation controlling section 114 which variably sets the widths of the sound pressure fluctuations to be imparted by the first and second fluctuating sections 211, 212 on the basis of the throttle opening degree data a and the engine rotation speed data b. The fluctuation controlling section 114 applies sound pressure fluctuation signals indicative of different fluctuation patterns to the first and second fluctuating sections 211, 212. The widths of the sound pressure fluctuations to be imparted by the first and second fluctuating sections 211, 212 may be set different from each other.

Figure 12:
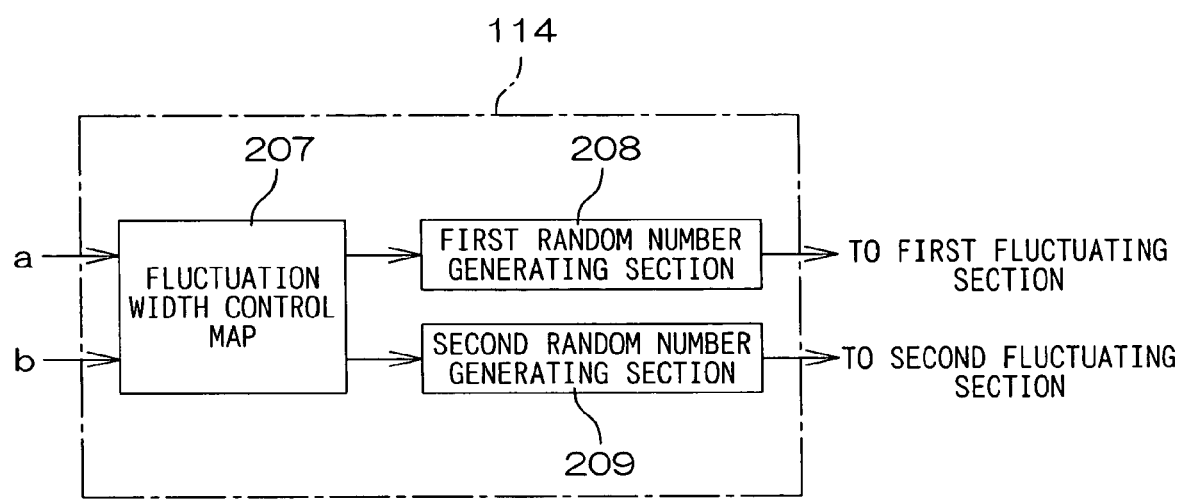
FIG. 12 is a block diagram illustrating the construction of a fluctuation controlling section by way of example.

As shown in FIG. 12, the fluctuation controlling section 114 includes, for example, a fluctuation width control map 207 (a fluctuation width controlling unit) which generates random number control signals as fluctuation width control signals on the basis of the throttle opening degree data a and the engine rotation speed data b, and first and second random number generating sections 208, 209 which respectively generate random numbers on the basis of the random number control signals received from the fluctuation width control map 207. In this case, the random number control signals generated by the fluctuation width control map 207 define the widths of the sound pressure fluctuations to be imparted to the synthetic sound data. The first and second random number generating sections 208, 209 respectively generate different random numbers within ranges corresponding to the defined fluctuation widths. The random numbers generated by the first and second random number generating sections 208 and 209 are applied as the sound pressure fluctuation signals to the first and second fluctuating sections 211 and 212, respectively.

The first and second fluctuating sections 211 and 212 include respective sound pressure amplifying sections that perform sound pressure amplifying processes on the synthetic sound data generated by the superposing section 1033 and sound delaying section 204, respectively. The gains of the first and second fluctuating sections 211 and 212 are variably set based on the sound pressure fluctuation signals applied from the first and second random number generating sections 208 and 209.

The first and second random number generating sections 208 and 209 each generate random numbers that are varied for everyone explosion of one cylinder. Specifically, the first and second random number generating sections 208 and 209 generate random numbers in synchronization with the start of the reproduction of engine sound data entities read out from the engine sound storing section 102. Thus, the first and second random number generating sections 208 and 209 determine the respective gains of the first and second fluctuating sections 211 and 212 during a time period for the reproduction of the engine sound data entities (corresponding to one explosion of one cylinder).

Figure 13:
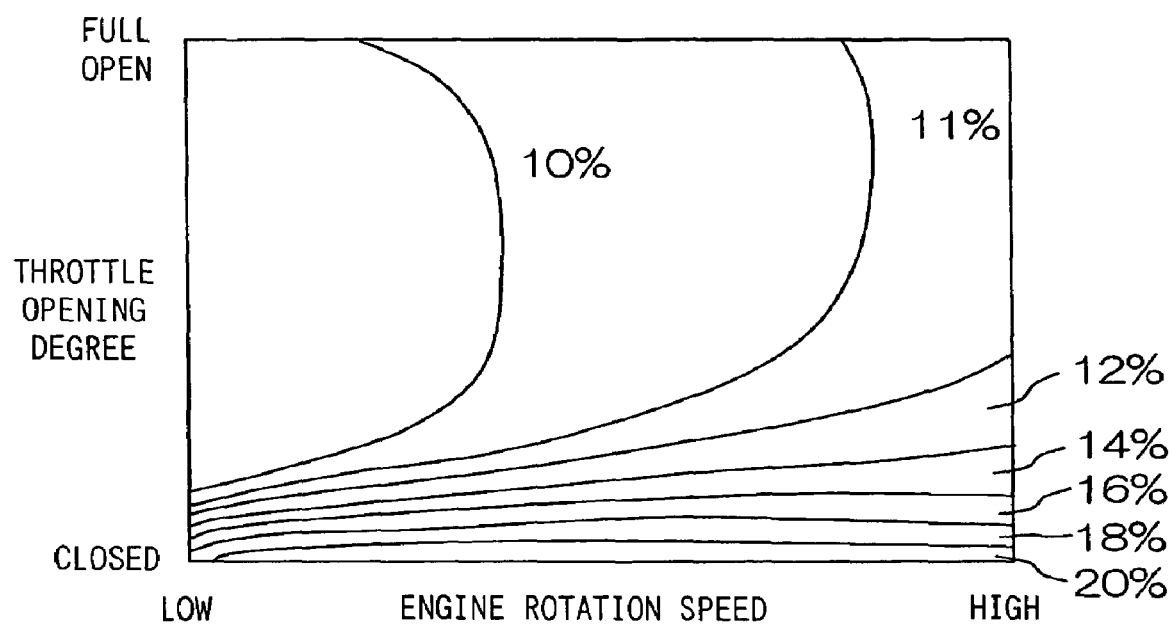
FIG. 13 is a diagram for explaining an exemplary setting of a fluctuation width control map.

FIG. 13 is a diagram for explaining an exemplary setting of the fluctuation width control map 207. FIG. 13 illustrates the result of an examination performed by calculating characteristic values from an expression (Standard deviation of maximum combustion pressure of engine)/(Average of maximum combustion pressure) with the throttle opening degree and the engine rotation speed each set at various values. The fluctuation width control map 207 is determined according to the characteristic shown in FIG. 13.

In general, the stability of the combustion is reduced and the sound pressure fluctuation of the engine sound is increased, as the throttle opening degree or the engine rotation speed decreases. Therefore, a synthetic sound that is very close to the actual engine sound can be provided by thus controlling the widths of the sound pressure fluctuations. The widths of the sound pressure fluctuations may be set different for the first and second fluctuating sections 211, 212.

In this preferred embodiment, the two synthetic sound data entities imparted with different sound pressure fluctuations according to the throttle opening degree and the engine rotation speed are superposed by the mixing section 206, whereby the synthetic engine sound of the two-cylinder engine can be generated as having a higher degree of indefiniteness (fluctuation). Since the widths of the sound pressure fluctuations are determined on the basis of the throttle opening degree and the engine rotation speed, a synthetic sound that is much closer to the actual engine sound can be generated.

In this preferred embodiment, the arrangement for generating the synthetic sound of the two-cylinder engine from the single-cylinder engine sound data (plural-cylinder sound synthesizing process) and the arrangement for imparting the sound pressure fluctuation to the synthetic sound data (sound fluctuating process) are added to the synthetic engine sound data generating section 103 of the first preferred embodiment. However, the synthetic engine sound data generating section 103 of the first preferred embodiment may be combined only with the arrangement for the plural-cylinder sound synthesizing process or only with the arrangement for the sound fluctuating process.

Further, it is possible to synthesize an engine sound of an engine having three or more cylinders. For example, synthetic sound data for an engine sound of a third cylinder can be generated by applying the synthetic sound data outputted from the sound delaying section 204 to another sound delaying section and delaying the synthetic sound data by an inter-cylinder time lag. Synthetic sound data for engine sounds of fourth and subsequent cylinders can be generated in the same manner.

Third Preferred Embodiment

Figure 14:
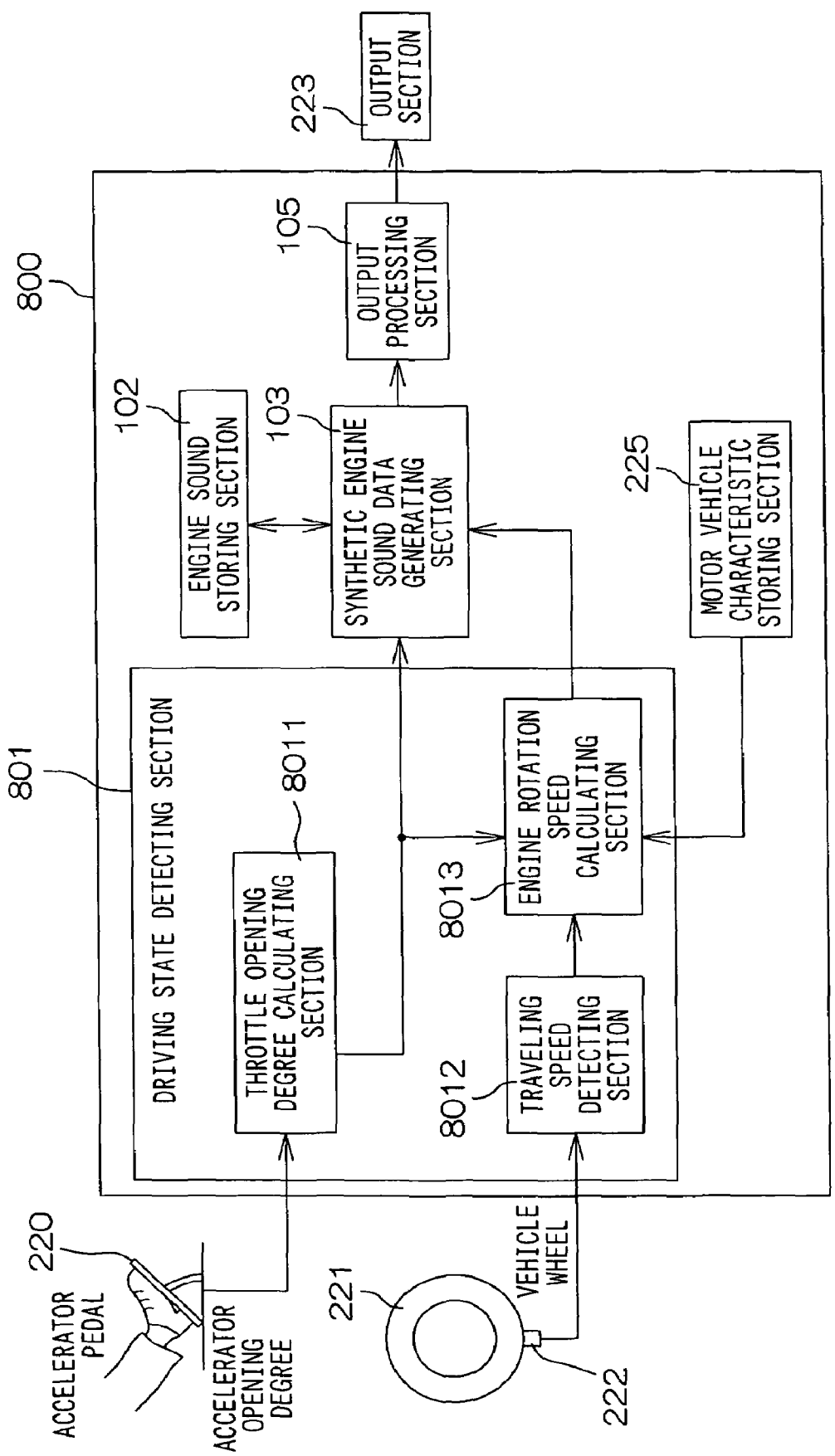
FIG. 14 is a block diagram illustrating the construction of an engine sound synthesizer according to a third preferred embodiment of the present invention.

FIG. 14 is a block diagram illustrating the construction of an engine sound synthesizer 800 according to a third preferred embodiment of the present invention. In FIG. 14, components corresponding to those shown in FIG. 3 will be denoted by the same reference characters as in FIG. 3.

The engine sound synthesizer 800 is mounted, for example, on a silent motor vehicle such as an electric motor vehicle, and is preferably used to generate a sound for drawing pedestrian's attention. Like the engine sound synthesizers 100 according to the first and second preferred embodiments, the engine sound synthesizer 800 preferably has a basic construction of a computer.

In FIG. 14, an accelerator pedal 220, a vehicle wheel 221, a vehicle speed sensor (vehicle wheel speed sensor) 222 attached to the vehicle wheel 221, and an output section 223 are provided in the electric motor vehicle. The accelerator pedal 220 and the vehicle speed sensor 222 function as an inputting unit for inputting driving state range specification information to the engine sound synthesizer 800. The output section 223 has an amplifier and a speaker. The speaker is attached to a vehicle body so as to output the sound toward the outside of the motor vehicle.

The engine sound synthesizer 800 includes a driving state detecting section 801, an engine sound storing section 102 and a synthetic engine sound data generating section 103. The driving state detecting section 801 includes a throttle opening degree calculating section 8011, a traveling speed detecting section 8012 and an engine rotation speed calculating section 8013.

The throttle opening degree calculating section 8011 receives an input of accelerator opening degree data indicative of the depression amount of the accelerator pedal depressed by a driver, and applies the accelerator opening degree data as the throttle opening degree data to the synthetic engine sound data generating section 103 and the engine rotation speed calculating section 8013, or converts the accelerator opening degree data into throttle opening degree data through a predetermined conversion computation and applies the throttle opening degree data to the synthetic engine sound data generating section 103 and the engine rotation speed calculating section 8013. The traveling speed detecting section 8012 computes the wheel traveling speed of the actually traveling electric motor vehicle on the basis of a signal outputted from the vehicle speed sensor 222, and applies the traveling speed to the engine rotation speed calculating section 8013. The engine rotation speed calculating section 8013 calculates a virtual engine rotation speed (which is different from the actual motor rotation speed of the motor vehicle) on the basis of the received traveling speed and the throttle opening degree data transferred from the throttle opening degree calculating section 8011, and applies the virtual engine rotation speed to the synthetic engine sound data generating section 103.

Since an electric motor (power source) of the electric motor vehicle is actually rotated, it is also conceivable to directly use the vehicle traveling speed and the motor rotation speed instead of the engine rotation speed. In reality, however, the electric motor and the engine are different in output characteristics, and the electric motor vehicle and the engine-driven motor vehicle are significantly different in the characteristics of the driving rotation speed and the transmission during the traveling. Therefore, it is unreasonable to determine the virtual engine rotation speed directly from the motor rotation speed and the vehicle traveling speed.

In this preferred embodiment, the virtual engine rotation speed is calculated by the engine rotation speed calculating section 8013, and then the synthetic engine sound data generating section 103 generates the synthetic engine sound data on the basis of the virtual engine rotation speed and the throttle opening degree calculated by the throttle opening degree calculating section 8011.

More specifically, the transmission patterns of a common automotive automatic transmission and the slide characteristics of an automotive torque converter are preliminarily recorded in a motor vehicle characteristic storing section 225 for the calculation of the engine rotation speed by the engine rotation speed calculating section 8013. The engine rotation speed calculating section 8013 calculates the engine rotation speed on the basis of the throttle opening degree and the vehicle traveling speed used as parameters according to the transmission patterns of the automotive automatic transmission and the slide characteristics of the automotive torque converter stored in the motor vehicle characteristic storing section 225. The engine rotation speed calculating section 8013 performs the calculation of the engine rotation speed performed according to a computation program.

After the synthetic engine sound data generating section 103 receives the throttle opening degree data and the engine rotation speed data, the generation of the synthetic engine sound data is achieved in the same manner as in the first preferred embodiment. The third preferred embodiment may be modified in the same manner as in the second preferred embodiment.

In the third preferred embodiment, plural engine sound data entities are prepared for each of the driving state ranges, and selectively combined to generate the synthetic engine sound data. Thus, a synthetic sound that is close to the actual engine sound can be generated. The synthetic engine sound is outputted from the electric motor vehicle according to the driving state of the motor vehicle, thereby drawing the attention of a pedestrian around the electric motor vehicle to the approach of the motor vehicle.

Fourth Preferred Embodiment

Figure 15:
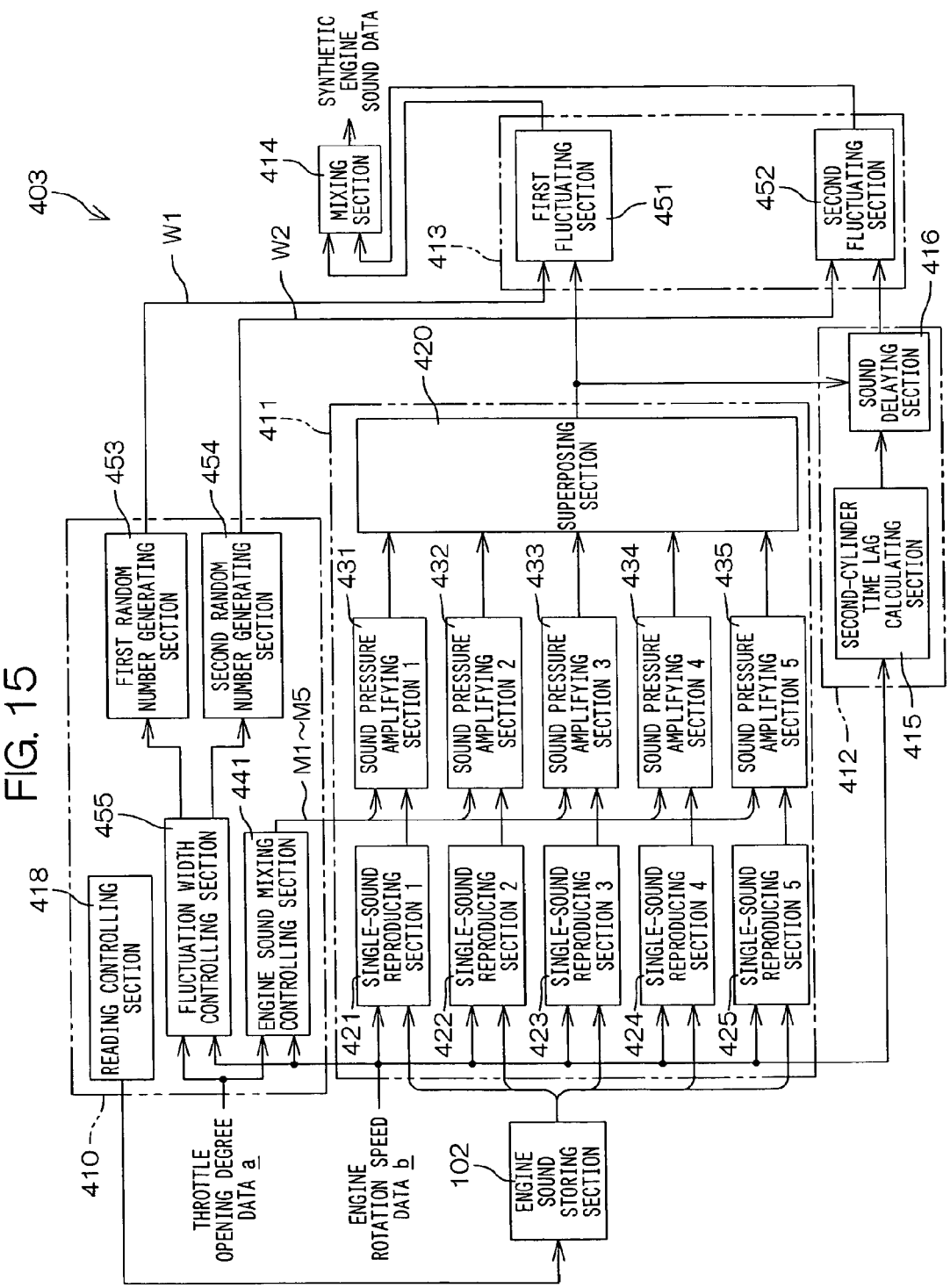
FIG. 15 is a block diagram for explaining the construction of an engine sound synthesizer according to a fourth preferred embodiment of the present invention, particularly illustrating the construction of a synthetic engine sound data generating section.

FIG. 15 is a block diagram for explaining the construction of an engine sound synthesizer according to a fourth preferred embodiment of the present invention, particularly illustrating the construction of a synthetic engine sound data generating section 403 provided instead of the synthetic engine sound data generating section 103 in FIG. 3. Reference is also made to FIGS. 3 and 5 in the following description.

In this preferred embodiment, data entities of an actually recorded engine sound are stored in a table as shown in FIG. 5 in an engine sound storing section 102 in one-to-one correspondence with a driving state range 1 (for an idling state with a minimum throttle opening degree and a minimum engine rotation speed), a driving state range 5 (with a minimum throttle opening degree and a maximum engine rotation speed), a driving state range 21 (with a maximum throttle opening degree and a minimum engine rotation speed) and a driving state range 25 (for a maximum output state with a maximum throttle opening degree and a maximum engine rotation speed) located in four corners of the table and a central driving state range 13 out of driving state ranges 1 to 25. Engine sound data entities for the other driving state ranges are not stored in the engine sound storing section 102. The unrecorded engine sound data entities are prepared by interpolative computation with the use of the engine sound data entities for the above-described five driving state ranges. The recorded engine sound data entities are provided by a single-cylinder engine and each have a length equivalent to one combustion cycle. In this preferred embodiment, an engine sound of a two-cylinder engine having first and second cylinders is synthesized with the use of the engine sound data entities for the single-cylinder engine.

The synthetic engine sound data generating section 403 includes a synthesizing section 411 which generates a synthetic sound data entity (an engine sound data entity for the first cylinder) by combining the five engine sound data entities stored in the engine sound storing section 102, a plural-cylinder sound synthesizing section 412 which generates an engine sound data entity for the second cylinder, a fluctuating section 413 which imparts sound pressure fluctuations to the engine sound data entities generated by the synthesizing section 411 and the plural-cylinder sound synthesizing section 412, respectively, a mixing section 414 as an inter-cylinder mixing unit which superposes the first-cylinder engine sound data entity and the second-cylinder engine sound data entity respectively imparted with the fluctuations for mixing, and a controller 410 which controls the synthesizing section 411 and the fluctuating section 413.

The synthesizing section 411 includes five single-sound reproducing sections 421 to 425 which respectively receive the five engine sound data entities read out of the engine sound storing section 102 by the controller 410, five sound pressure amplifying sections 431 to 435 which respectively sound-pressure-amplify sound signal data entities reproduced by the single-sound reproducing sections 421 to 425, and a superposing section 420 which superposes the sound signal data entities respectively sound-pressure-amplified by the five sound pressure amplifying sections 431 to 435.

The controller 410 includes a reading controlling section 418 which reads the engine sound data entities uniquely corresponding to the five driving state ranges out of the engine sound storing section 102 and applies the read engine sound data entities to the respective single-sound reproducing sections 421 to 425. The single-sound reproducing sections 421 to 425 repeatedly reproduce the respective sound data entities applied from the engine sound storing section 102. The single-sound reproducing sections 421 to 425 each receive engine rotation speed data b from a driving state detecting section 101. The single-sound reproducing sections 421 to 425 respectively reproduce the engine sound data entities at a reproduction rate according to the received engine rotation speed data b. Thus, sound signal data entities each having a length corresponding to one combustion cycle according to the engine rotation speed are provided.

The sound pressure amplifying sections 431 to 435 respectively function as weighting sections which weight the sound signal data entities outputted from the single-sound reproducing sections 421 to 425. The sound pressure amplifying sections 431 to 435 respectively receive sound pressure amplification signals M1 to M5 from the controller 410. The sound pressure amplification signals serve as weight setting signals for setting weights to be assigned to the respective sound signal data entities outputted from the single-sound reproducing sections 421 to 425.

Then, the weighted sound signal data entities are superposed by the superposing section 420. Thus, engine sound data entities corresponding to any of the driving state ranges 1 to 25 (see FIG. 5) can be generated by properly weighting the sound signal data entities respectively generated by the single-sound reproducing sections 421 to 425. That is, the synthesizing section 411 can perform an interpolating operation to prepare synthetic sound data entities for the engine sound of the first cylinder for any of the driving state ranges.

The throttle opening degree data a and the engine rotation speed data b are input to the controller 410. The controller 410 further includes an engine sound mixing controlling section 441 which generates the above-described sound pressure amplification signals M1 to M5 on the basis of the throttle opening degree data a and the engine rotation speed data b. The engine sound mixing controlling section 441 is constituted, for example, by a map which stores therein the sound pressure amplification signals M1 to M5 defined by the throttle opening degree data a and the engine rotation speed data b. The map is determined so that a synthetic sound data entity corresponding to a driving state range specified by the throttle opening degree data a and the engine rotation speed data b can be generated by the synthesizing section 411.

The plural-cylinder sound synthesizing section 412 includes a second-cylinder time lag calculating section 415 which calculates a time lag between the engine sounds of the first and second cylinders (a time lag of the second-cylinder engine sound with respect to the first-cylinder engine sound) on the basis of the engine rotation speed data b, and a sound delaying section 416 as a delaying unit which receives the synthetic sound data entity (first-cylinder engine sound data entity) applied from the synthesizing section 411 and delays the synthetic sound data entity by the time lag calculated by the second-cylinder time lag calculating section 415.

The fluctuating section 413 includes a first fluctuating section 451 which imparts a sound pressure fluctuation to the synthetic sound data entity generated by the synthesizing section 411, and a second fluctuating section 452 which imparts a sound pressure fluctuation to the synthetic sound data entity delayed by the sound delaying section 416. The first and second fluctuating sections 451, 452 function as sound pressure amplifying sections which respectively impart different patterns of sound pressure fluctuations to the synthetic sound data entities on the basis of sound pressure fluctuation signals W1, W2 applied from the controller 410.

The controller 410 further includes first and second random number generating sections 453, 454 which respectively generate the sound pressure fluctuation signals W1, W2 at random, and a fluctuation width controlling section 455 which generates random number control signals as fluctuation width control signals which define fluctuation widths (sound pressure fluctuation widths) of the sound pressure fluctuation signals W1, W2 to be generated by the first and second random number generating sections 453, 454. The fluctuation width controlling section 455 generates the random number control signals so as to define the sound pressure fluctuation widths on the basis of the throttle opening degree data a and the engine rotation speed data b. More specifically, a map may be used in which random number control signals are preliminarily allocated to various combinations of the throttle opening degree and the engine rotation speed. The map described with reference to FIG. 13 may be used as the map.

As described above, the stability of the combustion is generally reduced and the sound pressure fluctuation of the engine sound is generally increased, as the throttle opening degree or the engine rotation speed decreases. Therefore, a synthetic sound that is very close to the actual engine sound can be generated by thus controlling the widths of the sound pressure fluctuations.

The gains of the first and second fluctuating sections 451 and 452 are variably set based on the sound pressure fluctuation signals W1, W2 applied from the first and second random number generating sections 453 and 454. The first and second random number generating sections 453 and 454 each generate random numbers that are varied for every one explosion of one cylinder. Specifically, the first and second random number generating sections 453 and 454 generate random numbers in synchronization with the start of the reproduction of engine sound data entities by the single-sound reproducing sections 421-425. Thus, the first and second random number generating sections 453 and 454 determine the respective gains of the first and second fluctuating sections 451 and 452 during a time period for the reproduction of the engine sound data entities (corresponding to one explosion of one cylinder).

In this preferred embodiment, the synthetic sound data entities are imparted with the sound pressure fluctuations according to the throttle opening degree and the engine rotation speed to generate the synthetic engine sound data, so that a synthetic engine sound similar in indefiniteness to the actual engine sound can be generated. The provision of the plural-cylinder sound synthesizing section 412 makes it possible to synthesize the engine sound of the two-cylinder engine with the use of the data of the single-cylinder engine sound, thereby reducing the storage capacity requirement of the engine sound storing section 102.

The fourth preferred embodiment is applicable to an electric motor vehicle as described in the third preferred embodiment.

Further, it is possible to synthesize an engine sound of an engine having three or more cylinders. For example, synthetic sound data for an engine sound of a third cylinder can be generated by applying the synthetic sound data entity outputted from the sound delaying section 416 to another sound delaying section and delaying the synthetic sound data entity by an inter-cylinder time lag. Synthetic sound data for engine sounds of fourth and subsequent cylinders can be generated in the same manner.

Other Preferred Embodiments

In any of the above-described preferred embodiments, a selection inputting section may be provided for selecting a vehicle type. That is, the engine sound storing section 102 may store therein plural kinds of engine sound data entities for plural vehicle types. In this case, the engine sound data entities for each of the vehicle types are preferably stored together with control parameters such as vehicle type data, engine type data, cylinder number data, explosion interval data and engine sound pressure fluctuation width data in the engine sound storing section 102.

Where the vehicle type selection inputting section is provided in the fourth preferred embodiment, for example, a vehicle type specification signal is applied to the controller 410 from the vehicle type selection inputting section. The controller 410 reads out engine sound data entities for a specified vehicle type, and applies the read engine sound data entities to the single-sound reproducing sections 421 to 425. The engine sound mixing controlling section 441 of the controller 410 assigns weights (sound pressure amplification signals) according to the vehicle type to the respective sound pressure amplifying sections 431 to 435 so that the engine sound data entities are superposed in a sound mixing ratio according to the vehicle type. Further, the fluctuation width controlling section 455 preferably determines the widths of the sound pressure fluctuations according to the specified vehicle type. Further, the first and second random number generating sections 453, 454 preferably generate the sound pressure fluctuation signals W1, W2 for providing fluctuation patterns according to the specified vehicle type.

While the present invention has been described in detail with reference to preferred embodiments thereof, it should be understood that the foregoing disclosure is merely illustrative of the technical principles of the present invention but not limitative of the same. The spirit and scope of the present invention are to be limited only by the appended claims.

This application corresponds to Japanese Patent Application No. 2003-351198 filed with the Japanese Patent Office on Oct. 9, 2003, the disclosure of which is incorporated herein by reference.

What is claimed is:

1. An engine sound synthesizer comprising:
a storage unit which stores therein engine sound data entities as source data;
a synthesizing unit which generates synthetic sound data by selectively reading the engine sound data entities out of the storage unit and selectively combining the read engine sound data entities;
a fluctuating unit which imparts a sound pressure fluctuation to the synthetic sound data generated by the synthesizing unit to generate fluctuated synthetic engine sound data; and
a fluctuation width controlling unit which controls a width of the sound pressure fluctuation to be imparted to the synthetic sound data by the fluctuating unit on the basis of externally input driving state specification information specifying a driving state of a virtual engine; wherein
each of the engine sound data entities has a length equivalent to one explosion of one cylinder of an engine.

2. An engine sound synthesizer as set forth in claim 1,
wherein the driving state of the virtual engine is defined by parameters comprising a throttle opening degree and an engine rotation speed,
wherein the driving state specification information comprises information related to the throttle opening degree and the engine rotation speed.

3. An engine sound synthesizer as set forth in claim 2, wherein the fluctuation width controlling unit determines the width of the sound pressure fluctuation so that the width of the sound pressure fluctuation is increased as the engine rotation speed decreases.

4. An engine sound synthesizer as set forth in claim 1, which is adapted to synthesize an engine sound of an engine having a plurality of cylinders,
wherein the engine sound synthesizer further comprises:
an inter-cylinder time lag calculating unit which calculates an inter-cylinder engine sound time lag on the basis of the engine rotation speed information;
a delaying unit which delays the synthetic sound data generated by the synthesizing unit by the time lag calculated by the inter-cylinder time lag calculating unit; and
an inter-cylinder mixing unit which superposes the synthetic sound data generated by the synthesizing unit and the synthetic sound data delayed by the delaying unit for mixing.

5. An engine sound synthesizer as set forth in claim 4, further comprising, in addition to the fluctuating unit as a first fluctuating unit, a second fluctuating unit which imparts a sound pressure fluctuation to the synthetic sound data delayed by the delaying unit to generate fluctuated synthetic engine sound data,
wherein the inter-cylinder mixing unit superposes the fluctuated synthetic engine sound data generated by the first fluctuating unit and the fluctuated synthetic engine sound data generated by the second fluctuating unit for mixing, wherein the fluctuation width controlling unit controls widths of the sound pressure fluctuations to be imparted to the synthetic sound data by the first and second fluctuating units.

6. A motor vehicle comprising:

an input section for inputting driving state specification information specifying a driving state of a virtual engine;

an engine sound synthesizer which generates synthetic engine sound data on the basis of the driving state specification information input from the input section; and an output section which outputs a synthetic engine sound on the basis of the synthetic engine sound data generated by the engine sound synthesizer, wherein the engine sound synthesizer comprises:

a storage unit which stores therein engine sound data entities as source data;

a synthesizing unit which generates synthetic sound data by selectively reading the engine sound data entities out of the storage unit and selectively combining the read engine sound data entities;

a fluctuating unit which imparts a sound pressure fluctuation to the synthetic sound data generated by the synthesizing unit to generate fluctuated synthetic engine sound data; and a fluctuation width controlling unit which controls a width of the sound pressure fluctuation to be imparted to the synthetic sound data by the fluctuating unit on the basis of the driving state specification information input from the input section; wherein each of the engine sound data entities has a length equivalent to one explosion of one cylinder of an engine.

7. A game machine comprising:

an operation section for inputting driving state specification information specifying a driving state of a virtual engine;

an engine sound synthesizer which generates synthetic engine sound data on the basis of the driving state specification information input from the operation section; and an output section which outputs a synthetic engine sound on the basis of the synthetic engine sound data generated by the engine sound synthesizer, wherein the engine sound synthesizer comprises:

a storage unit which stores therein engine sound data entities as source data;

a synthesizing unit which generates synthetic sound data by selectively reading the engine sound data entities out of the storage unit and selectively combining the read engine sound data entities;

a fluctuating unit which imparts a sound pressure fluctuation to the synthetic sound data generated by the synthesizing unit to generate fluctuated synthetic engine sound data; and a fluctuation width controlling unit which controls a width of the sound pressure fluctuation to be imparted to the synthetic sound data by the fluctuating unit on the basis of the driving state specification information input from the operation section; wherein each of the engine sound data entities has a length equivalent to one explosion of one cylinder of an engine.

8. An engine sound synthesizing method comprising the steps of:

receiving driving state specification information specifying a driving state of a virtual engine;

generating synthetic sound data by selectively reading engine sound data entities as source data out of a storage unit and selectively combining the read engine sound data entities;

imparting a sound pressure fluctuation to the generated synthetic sound data; and controlling a width of the sound pressure fluctuation to be imparted to the synthetic sound data on the basis of the driving state specification information; wherein each of the engine sound data entities has a length equivalent to one explosion of one cylinder of an engine.

9. A non-transitory computer readable medium storing a computer program for causing a computer to operate as an engine sound synthesizer for synthesizing an engine sound, the computer comprising storage unit which stores therein engine sound data entities as source data, the computer program causing the computer to function as:

a driving state specification information receiving unit which receives driving state specification information specifying a driving state of a virtual engine;

a synthesizing unit which generates synthetic sound data by selectively reading the engine sound data entities out of the storage unit and selectively combining the read engine sound data entities;

a fluctuating unit which imparts a sound pressure fluctuation to the synthetic sound data generated by the synthesizing unit to generate fluctuated synthetic engine sound data; and a fluctuation width controlling unit which controls a width of the sound pressure fluctuation to be imparted to the synthetic sound data by the fluctuating unit on the basis of the driving state specification information received by the driving state specification information receiving unit; wherein each of the engine sound data entities has a length equivalent to one explosion of one cylinder of an engine.

10. A non-transitory computer readable medium storing a computer program as set forth in claim 9, wherein the driving state of the virtual engine is defined by parameters comprising a throttle opening degree and an engine rotation speed, wherein the driving state specification information comprises information related to the throttle opening degree and the engine rotation speed.

11. A non-transitory computer readable medium storing a game program for causing a computer to function as a game machine, the game program incorporating a computer program for causing the computer to function as an engine sound synthesizer, the computer comprising a storage unit which stores therein engine sound data entities as source data, the computer program causing the computer to function as:

a driving state specification information receiving unit which receives driving state specification information specifying a driving state of a virtual engine;

a synthesizing unit which generates synthetic sound data by selectively reading the engine sound data entities out of the storage unit and selectively combining the read engine sound data entities;

a fluctuating unit which imparts a sound pressure fluctuation to the synthetic sound data generated by the synthesizing unit to generate fluctuated synthetic engine sound data; and a fluctuation width controlling unit which controls a width of the sound pressure fluctuation to be imparted to the synthetic sound data by the fluctuating. unit on the basis of the driving state specification information received by the driving state specification information receiving unit; wherein each of the engine sound data entities has a length equivalent to one explosion of one cylinder of an engine.

* * * * *